US009632899B2

(12) United States Patent
Hotta et al.

(10) Patent No.: US 9,632,899 B2
(45) Date of Patent: Apr. 25, 2017

(54) METHOD FOR ANALYZING REQUEST LOGS IN ADVANCE TO ACQUIRE PATH INFORMATION FOR IDENTIFYING PROBLEMATIC PART DURING OPERATION

(71) Applicant: FUJITSU LIMITED, Kawasaki-shi, Kanagawa (JP)

(72) Inventors: Yuuji Hotta, Kawasaki (JP); Atsuji Sekiguchi, Kawasaki (JP); Takeshi Yasuie, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 121 days.

(21) Appl. No.: 14/522,049

(22) Filed: Oct. 23, 2014

(65) Prior Publication Data
US 2015/0135018 A1 May 14, 2015

(30) Foreign Application Priority Data
Nov. 12, 2013 (JP) ................................. 2013-233679

(51) Int. Cl.
*G06F 11/00* (2006.01)
*G06F 11/30* (2006.01)
*G06F 11/34* (2006.01)
*G06F 17/30* (2006.01)

(52) U.S. Cl.
CPC ...... *G06F 11/3006* (2013.01); *G06F 11/3419* (2013.01); *G06F 11/3476* (2013.01); *G06F 11/3495* (2013.01); *G06F 17/30* (2013.01); *G06F 2201/81* (2013.01); *G06F 2201/875* (2013.01)

(58) Field of Classification Search
CPC ............ G06F 11/3006; G06F 11/3419; G06F 11/3476; G06F 11/3495; H04L 43/02–43/0823; H04L 43/0852–43/50
See application file for complete search history.

(56) References Cited

U.S. PATENT DOCUMENTS

| | | | | |
|---|---|---|---|---|
| 2009/0287744 A1* | 11/2009 | Bernardini | .......... | G06F 11/3419 |
| 2009/0287768 A1* | 11/2009 | Tanaka | ................ | G06F 11/3409 |
| | | | | 709/203 |
| 2010/0077092 A1 | 3/2010 | Akaboshi | | |
| 2012/0221712 A1* | 8/2012 | Sullivan | .............. | G06F 11/3476 |
| | | | | 709/224 |

FOREIGN PATENT DOCUMENTS

| | | |
|---|---|---|
| JP | 2009-26078 | 2/2009 |
| JP | 2010-67047 | 3/2010 |

* cited by examiner

*Primary Examiner* — Michael Maskulinski
(74) *Attorney, Agent, or Firm* — Fujitsu Patent Center

(57) ABSTRACT

Common parameters in common between a plurality of request logs are extracted from parameters in the plurality of request logs. The plurality of request logs is obtained when a request is executed by a process that uses a plurality of components. A common parameter different from a common parameter extracted for another process among the extracted common parameters is determined as an identification parameter that identifies the process. This allows accurately categorizing the process based on a log to be obtained when the process is executed.

20 Claims, 21 Drawing Sheets

FIG. 3

ACCESS LOG EXAMPLE — 122

```
http://foo.com/?fid=3&tab=2, 308378505-httpWorkerThread-28080-0-1, 211811134
http://foo.com/?fid=3&tab=2, 308378505-httpWorkerThread-28080-15-1, 324824
http://foo.com/?fid=3&tab=5&ui=small, 308378505-httpWorkerThread-28080-6-1, 331890
http://foo.com/?fid=4&ui=small&col=5, 308378505-httpWorkerThread-28080-5-1, 2126540
http://foo.com/?fid=4&ui=tiny&col=5, 308378505-httpWorkerThread-28080-5-2, 2123330
http://foo.com/?fid=4&ui=small&col=4, 308378505-httpWorkerThread-28080-7-2, 2026540
```

FIG. 4

DETAIL LOG EXAMPLE

S, 308378505-httpWorkerThread-28080-0-1, 1364973798273463, com/foo/pkg/servlet/filters/BasePkgFilter, #isFilterEnabled
S, 308378505-httpWorkerThread-28080-0-1, 1364973798273470, com/foo/pkg/kernel/log/LogWrapper, #isDebugEnabled
S, 308378505-httpWorkerThread-28080-0-1, 1364973798273473, com/foo/pkg/log/Log4jLogImpl, #isDebugEnabled
S, 308378505-httpWorkerThread-28080-15-1, 1364973798273494, com/foo/pkg/kernel/servlet/filters/invoker/InvokerFilterChain, #doFilter
S, 308378505-httpWorkerThread-28080-0-1, 1364973798273498, com/foo/pkg/servlet/filters/BasePkgFilter, #isFilterEnabled
S, 308378505-httpWorkerThread-28080-15-1, 1364973798273504, com/foo/pkg/kernel/servlet/BaseFilter, #isFilterEnabled

123

COMPONENT DEFINITION EXAMPLE com/foo/pkg/servlet, p1, Servlet
com/foo/pkg/kernel, p2, Kernel
com/foo/pkg/log, p3, Log
org/hibernate/Session, p4, Hibernate
...

FIG. 6

PATH TABLE EXAMPLE 125

1, p1:p2:p3:p4, http://foo.com/?fid=3&tab=2
1, p1:p2:p3:p4, http://foo.com/?fid=3&tab=3
1, p1:p2:p3:p4, http://foo.com/?fid=3&tab=5&ui=small
2, p1:p4:p5:p7:p8, http://foo.com/?fid=4&ui=small&col=5
2, p1:p4:p5:p7:p8, http://foo.com/?fid=4&ui=tiny&col=5
3, p3:p8:p9, http://foo.com/?fid=4&ui=small&col=4

FIG. 8

PATH INFORMATION EXAMPLE — 127

1, p1:p2:p3:p4, http://foo.com/?tab=
2, p1:p4:p5:p7:p8, http://foo.com/?col=5
3, p3:p8:p9, http://foo.com/?col=4

FIG. 21

```
http://foo.com/?fid=3&tab=2&uid=3523,
http://foo.com/?fid=3&tab=2&uid=9246
http://foo.com/?ui=small
INFINITE NUMBER OF URIs, FOR EXAMPLE, "uid= . . ." APPEARS
```

METHOD FOR ANALYZING REQUEST LOGS IN ADVANCE TO ACQUIRE PATH INFORMATION FOR IDENTIFYING PROBLEMATIC PART DURING OPERATION

CROSS-REFERENCE TO RELATED APPLICATION

This application is based upon and claims the benefit of priority of the prior Japanese Application No. 2013-233679 filed on Nov. 12, 2013 in Japan, the entire contents of which are hereby incorporated by reference.

FIELD

The present invention relates to an analysis method, an analysis apparatus, and a computer-readable recording medium storing an analysis program.

BACKGROUND

In an application program, a network service, or similar situation, there has been an attempt to identify a delay part or an abnormal part under the condition where the operation is actually performed.

Usually, to identify the delay part or the abnormal part, it is desired to obtain the logs before and after that part and keep monitoring the state. For a processing sequence of, for example, start-A-B-C-D-end, logs with time stamps are obtained immediately before A, between A and B, between B and C, between C and D, and immediately after D. This allows identifying the process where delay occurs among the processes A to D. For example, in the case where the process B is delayed, the log immediately before B (between A and B) and the log immediately after B (between B and C) are referenced. This allows identifying the process B as a delay part.

On the other hand, in an application program or a network service, to identify a delay part or an abnormal part, it is desired to obtain a large amount of log in a large number of monitored parts. Accordingly, when a delay part or an abnormal part is narrowed down or identified, heavy overhead and network load occur.

There has been an attempt to obtain and analyze a detailed log in advance so as to acquire path information for each function (process) for identifying a problematic part without generating extra overhead or network load during the operation. In this case, during the operation, the path information acquired in advance is used to analyze and identify the problematic part. Here, the path information includes, for example, information (component group) that identifies a component to be used in each function. At this time, the path information for each function of Web is categorized by, for example, a uniform resource identifier (URI) that includes a uniform resource locator (URL).

For example, as illustrated in FIG. 20, assuming that p1 to p5 are network components, the message data flowing through the respective components p1 to p5 is analyzed to categorize the components to be used in respective functions Fi (i is a natural number) for each function Fi using URIs corresponding to the respective functions Fi.

Path of Function F1=p1-p2-p4-p5
Path of Function F2=p1-p3-p5
Path of Function F3=p1-p2
Path of Function F4=p3-p4

At this time, the URI includes parameters such as identification (ID). Therefore, an enormous number of different URIs appear based on the combinations of the parameters. For example, as illustrated in FIG. 21, in the case where the URI includes a uid (user ID) as the parameter, there are an infinite number of values for the uid. Therefore, an infinite number of URIs appear.

When the parameters such as this ID are included in the URI, the URIs with the different IDs are categorized as respective different processes. For example, in the case where the respective URIs have different user IDs even when the URIs correspond to the same process, the respective URIs are categorized as different processes. Accordingly, the data amount of the path information becomes enormous.

SUMMARY

An analysis method in this case extracts common parameters in common between a plurality of request logs that are obtained when a request is executed by a process that uses a plurality of components, from parameters in the plurality of request logs. The analysis method in this case determines a common parameter different from a common parameter extracted for another process among the extracted common parameters, as an identification parameter that identifies the process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 is a diagram illustrating an exemplary access log according to this embodiment;

FIG. 4 is a diagram illustrating an exemplary detail log according to this embodiment;

FIG. 6 is a diagram illustrating an exemplary path table according to this embodiment;

FIG. 8 is a diagram illustrating exemplary path information according to this embodiment;

FIG. 21 is a diagram illustrating an example of a URI that includes a user ID as a parameter.

DESCRIPTION OF THE PREFERRED EMBODIMENTS

Figure 1:
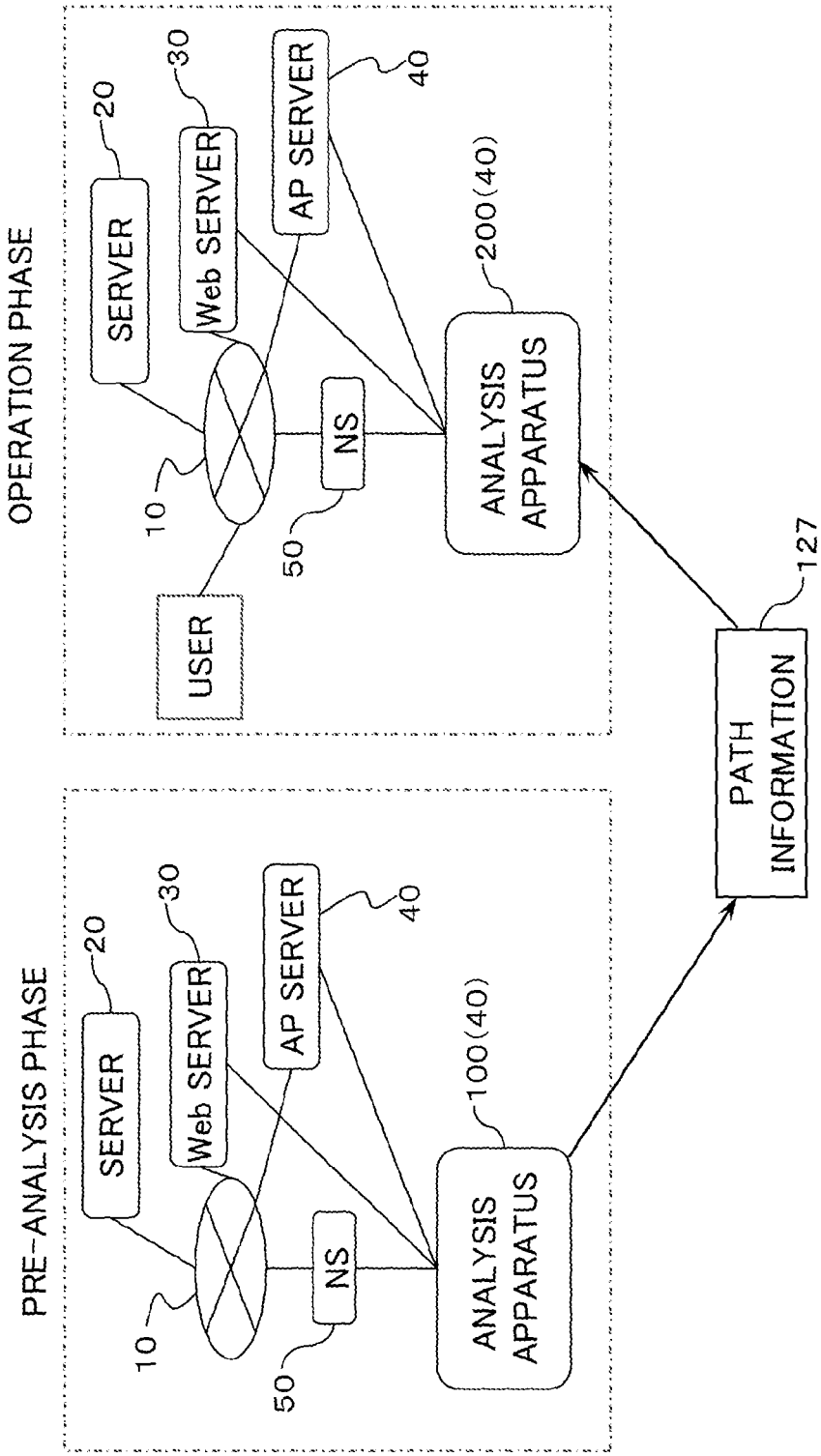
FIG. 1 is a block diagram illustrating an exemplary network system to which an analysis apparatus according to this embodiment is applied.

The following describes embodiments of an analysis method, an analysis apparatus, and an analysis program disclosed by this application in detail with reference to the accompanying drawings. However, the embodiments that will be described hereinafter are just examples, and not intended to exclude various modifications and applications of the technique that are not specified in the embodiments. That is, the embodiments may be modified in various ways and implemented without departing from the spirit of the present invention. Each of the accompanying drawings does not only include components illustrated in the drawings in effect, and may include another function. The respective embodiments may be combined as necessary to the extent that the processing details do not conflict with one another.

(1) Configuration of this Embodiment

With reference to FIG. 1 to FIG. 8, a description will be given of a configuration of this embodiment.

(1-1) Configuration of Network System According to this Embodiment

Firstly, with reference to FIG. 1, a description will be given of a configuration of a network system to which an analysis apparatus 100 according to this embodiment is applied. Here, FIG. 1 is a block diagram illustrating an exemplary network system to which the analysis apparatus 100 according to this embodiment is applied.

The network system illustrated in FIG. 1 includes, for example, a network 10 such as Internet, a group of servers 20, 30, and 40 that are coupled to the network 10, a network switch (NS) 50, analysis apparatuses 100 and 200, and similar member. The group of servers 20, 30, and 40 includes, for example, a Web server 30, an application (AP) server 40, another server 20, and similar member.

The AP server 40 includes, for example, a processing unit such as a central processing unit (CPU), a memory such as a read only memory (ROM) and a random access memory (RAM), a storage device such as a hard disk drive (HDD) and a solid state drive (SSD), a display device such as a liquid crystal display (LCD), a printing device, and similar member. In the AP server 40, the CPU reads a predetermined application program (see reference numeral 41 in FIG. 2) from the memory or the storage device and executes the predetermined application program so as to achieve various functions. For example, the computation result and similar result by the CPU can be output to the display device and the printing device. Here, for the other server 20 and the Web server 30, as hardware, similarly to the above description, the CPU, the memory, the storage device, the display device, the printing device, and similar member are provided.

The analysis apparatus 100 generates path information 127, which is described later, in a pre-analysis phase. The analysis apparatus 200 identifies a problematic part based on the path information 127 generated in advance by the analysis apparatus 100 in an operation phase. Here, the respective functions as the analysis apparatuses 100 and 200 may be achieved by a processing device such as a personal computer (PC) included in the network system of this embodiment, or may be achieved by the AP server 40 and similar member included in the network system of this embodiment. The functions as the analysis apparatuses 100 and 200 may be achieved by one processing device, one AP server 40, or similar member.

As described later with reference to FIG. 2, the analysis apparatus 100 inputs data (such as a request) of the user-request database (not illustrated) to the network 10 as data of a virtual user, so as to obtain request logs output from the AP server 40 and similar member. Then, as described later with reference to FIG. 2, the analysis apparatus 100 generates the path information 127 described later based on the obtained request logs.

In the operation phase, the analysis apparatus 200 obtains, for example, URL+common gateway interface (CGI) parameter or similar parameter from the data flowing through the group of servers 20, 30, and 40 in the actual operation, as log data (the request log described later). The analysis apparatus 200 collates the obtained log data with the path information 127 obtained by the analysis apparatus 100 so as to sort out (categorize) the function of the log data. Then, for example, the analysis apparatus 200 executes a process (a process for computing timing of a change in state) for cutting out the time zone in which a normal state and an abnormal state are not mixed together in each sorted-out function. Subsequently, in the case where the analysis apparatus 200 performs a detection of a delay in the cut-out time zone and then detects a delay, the analysis apparatus 200 collates the detection result with the path information 127 so as to narrow down or identify the problematic part.

In this embodiment, the analysis apparatus 100 for the pre-analysis phase relates to a characteristic technique in this case. The following describes the configuration, the function, the operation, and similar feature of the analysis apparatus 100 for the pre-analysis phase in detail.

(1-2) Configuration of Analysis Apparatus According to this Embodiment

Next, with reference to FIG. 2, a description will be given of the configuration of the analysis apparatus 100 according to this embodiment. FIG. 2 is a block diagram illustrating a hardware configuration and a functional configuration of the analysis apparatus 100 of this embodiment. As described above, the analysis apparatus 100 is included in a processing device separated from the AP server 40 and similar member or from the group of servers 20, 30, and 40. In this embodiment, the analysis apparatus 100 is included in the processing device separated from the group of servers 20, 30, and 40.

The analysis apparatus 100 includes a CPU, a microprocessing unit (MPU), a processing unit 110 such as a computer, and a storage unit 120 such as a RAM and an HDD. The processing unit 110 reads a predetermined application program (analysis program) from the storage unit 120 and executes the predetermined application program so as to realize functions as a log obtaining unit 111, a flow analyzing unit 112, a parameter extracting unit 113, and a parameter processing unit 114 described later. The storage unit 120 saves the predetermined application program, and additionally saves various information that is required for a pre-analysis process performed by the processing unit 110. As the various information, the storage unit 120 saves, for example, a log definition 121, an access log 122, a detail log 123, a component definition 124, a path table 125, a parameter table 126, and a path information 127.

The predetermined application program is provided in a form record in a computer-readable recording medium such as a flexible disk, a CD (for example, a CD-ROM, a CD-R, and a CD-RW), a DVD (for example, a DVD-ROM, a DVD-RAM, a DVD-R, a DVD-RW, a DVD+R, and a DVD+RW), and a blu-ray disc. In this case, the processing unit 110 reads the program from this storage medium, forwards the program to an internal storage device or an external storage device to be stored, and then uses the program.

In this embodiment, to identify a problematic part without generating extra overhead or network load during the operation in the analysis apparatus 200, the analysis apparatus 100 preliminarily obtains and analyzes a detailed log so as to generate and acquire the path information 127 for each function (process). Here, the path information 127 includes, for example, the information (component group) that identifies the components to be used in each function. At this time, the path information 127 for each function of Web is categorized by, for example, a URI (URL).

Figure 20:
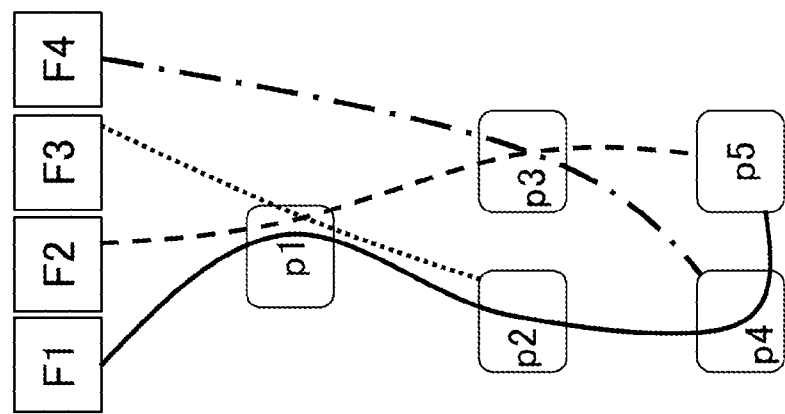
FIG. 20 is a diagram illustrating an exemplary correspondence relationship (path information) between functions (processes) and component groups (paths)

For example, as described above with reference to FIG. 20, by analyzing the message data flowing the respective components p1 to p5, the components to be used in the respective functions Fi (i is a natural number) are categorized for each function Fi using the URIs corresponding to the respective functions Fi. Here, the components p1 to p5 can be processed in units of methods or in units of blocks of the program. The term "component" might be replaced by the term "module" or "check point" in use. Additionally, "path" is considered to be a collection (component group) of the "components". The information indicating a correspondence relationship between the respective functions (processes) Fi and the plurality of the components p1 to p5 is referred to as "path information".

Here, a brief description will be given of a function for identifying the problematic part (abnormal part) of the analysis apparatus 200 to be used in the operation phase. As the example illustrated in FIG. 20, in the case where the functions F1 and F2 are delayed compared with a normal operation, the analysis apparatus 200 can collate the path information 127 to determine that there might be a problem (abnormality) in the components p1, p2, p3, p4, and p5 corresponding to the function F1 and F2. Furthermore, the analysis apparatus 200 can determine that there is no problem with the common the components p1, p2, p3, and p4 of the functions F1, F2 and F3 based on, for example, the information that the function F3 and F4 are not delayed and the path information 127 for the functions F3 and F4. As a result, the analysis apparatus 200 can identify the remaining component p5 as the part causing the delay.

Here, in the case where an analysis target is the program, the components p1 to p5 can be processed in units for calling the methods (functions), in units of blocks, in units of log outputting parts specified by the user, or in units of combinations of any of these as follows.

Units for Calling Methods (Functions) p1=method1( ) to p2=method2( ) to p4=method3( ), for example Units of Blocks (if statement or a block segmented by { } or similar character) p1=while( . . . ) to p2=if ( ) . . . to p4=else . . . , for example Units of Log Outputting Part Specified by User p1={file=foo.java,line=35} to p2={file=foo.java,line=55} to p4={file=boo.java,line=20}, for example As described above, in the pre-analysis phase, the analysis apparatus 100 of this embodiment obtains the request logs from the AP server 40 and similar member in the network system to generate the path information 127. Accordingly, in this embodiment, in the pre-analysis phase, the user 60 manually issues a request through the network 10 to an application program (hereinafter referred to simply as the application) 41 that operates in the AP server 40. Alternatively, a request issuing unit 60 automatically issues a request through the network 10 to the application 41 in the AP server 40. In the AP server 40 that has received a request, the process corresponding to the request is executed by the application 41 and the request log corresponding to the request is output from a log output unit 42 to the analysis apparatus 100. Here, in the pre-analysis phase, similarly from the other server 20 and the Web server 30, the request log is output from the log output unit 42 to the analysis apparatus 100.

Next, a description will be given of the functions as the log obtaining unit 111, the flow analyzing unit 112, the parameter extracting unit 113, and the parameter processing unit 114 that are achieved by the processing unit 110 with reference to FIG. 2 to FIG. 8.

The log obtaining unit 111 obtains the request logs from the log output units 42 of the AP server 40 and similar server for each request. Each request log includes one access log and a plurality of detail logs corresponding to this one access log. At this time, the log output units 42 incorporated in the AP server 40 and similar server each output the access log 122 and the detail log 123 corresponding to the request for the application 41 to the log obtaining unit 111 in accordance with the log definition 121. Alternatively, the log obtaining unit 111 refers to the log definition 121 of the storage unit 120 to obtain the access log 122 and the detail log 123 corresponding to the request for the application 41 in accordance with the log definition 121 through the log output unit 42. The access log 122 and the detail log 123 that are obtained for each request by the log obtaining unit 111 are saved in the storage unit 120. Here, the log definition 121 is information that identifies the class and the package of the output target to be output as the detail log and preliminarily set in the log output unit 42 or the storage unit 120.

FIG. 3 is a diagram illustrating one example of the access log 122 according to this embodiment. The access log 122 is output by the log output unit 42 and is an access log to the application 41. The access log 122 includes, for example, a URI, a transaction ID (hereinafter expressed as TranID), and a processing time. Here, in FIG. 3, for example, "308378505-httpWorkerThread-28080-0-1" in the access log of the first line is a TranID.

FIG. 4 is a diagram illustrating one example of the detail log 123 according to this embodiment. The detail log 123 is a detail log of the access log 122 that is outputted by the log output unit 42 and corresponds to the access log 122. The detail log 123 includes, for example, a time, a TranID, a class, and a method. Here, as illustrated in FIG. 4, each detail log 123 corresponds to one access log 122 by the TranID. For example, the detail logs in the first to third and fifth lines in FIG. 4 correspond to the access log in the first line in FIG. 3 by the TranID "308378505-httpWorkerThread-28080-0-1". The detail logs in the fourth and sixth in FIG. 4 correspond to the access log in the second line in FIG. 3 by the TranID "308378505-httpWorkerThread-28080-15-1".

The flow analyzing unit 112 performs a flow analysis for each URI (request) based on the access log 122, the detail log 123, and the component definition 124 so as to create the path table 125. The flow analyzing unit 112 includes a component-type acquiring unit 112a and a path-table creating unit 112b. The procedure of the process (path-table creating process) by the flow analyzing unit 112 is described later with reference to FIG. 10.

The component-type acquiring unit 112a extracts a plurality of the detail logs 123 corresponding to a URI based the TranID of this URI for each URI (request or access log; function/process). The component-type acquiring unit 112a acquires the type (any one of p1, p2, . . . ) of a correspondence component corresponding to each detail log among a plurality of components (for example, p1, p2, . . . ) based on the descriptions included in the respective plurality of the extracted detail logs 123. At this time, the component-type acquiring unit 112a acquires the type of the correspondence component using the component definition 124 preliminarily set in the storage unit 120. The concrete example of the process for extracting the detail logs 123 by the component-type acquiring unit 112a is described later with reference to FIG. 14. Additionally, the concrete example of a component-type acquiring process by the component-type acquiring unit 112a is described later with reference to FIG. 15.

The component definition 124 identifies the unit for collectively processing the detail logs 123 as the component (any one of p1, p2, . . . ). More specifically, the component definition 124 is a definition for creating a category of the path information 127 from the information included in the detail log 123, and make a correspondence between the description included in each of the plurality of the detail logs 123 and the type (any one of p1, p2, . . . ) of the component.

Figure 5:
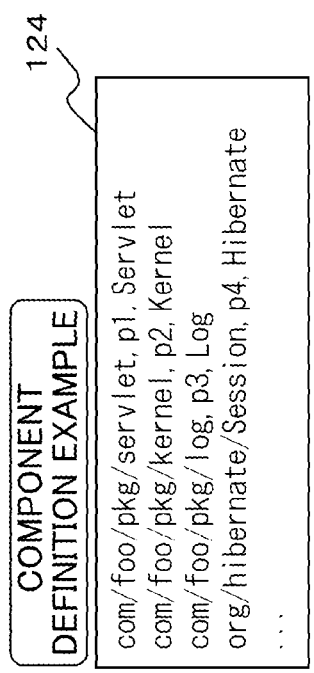
FIG. 5 is a diagram illustrating an exemplary component definition according to this embodiment.

FIG. 5 is a diagram illustrating one example of the component definition 124 according to this embodiment. In the component definition 124 illustrated in FIG. 5, the component definition 124 is set such that the description "com/foo/pkg/servlet" of the detail log 123 corresponds to the component p1 and the description "com/foo/pkg/kernel" corresponds to the component p2 of the detail log 123. Additionally, the component definition 124 is set such that the description "com/foo/pkg/log" of the detail log 123 corresponds to the component p3 and the description "org/hibernate/Session" of the detail log 123 corresponds to the component p4.

The path-table creating unit (correspondence-table creating unit) 112b creates the path table (correspondence table) 125 that makes a correspondence between the type of the correspondence component acquired with respect to each URI and the description related to the parameter included in the corresponding access log for each URI (request; function/process). The path table 125 created by the path-table creating unit 112b is saved in the storage unit 120. The concrete example of the process by the path-table creating unit 112b is described later with reference to FIG. 15.

As described above, the path table 125 makes a correspondence between the type of the correspondence component acquired for each URI and the description related to the parameter included in the corresponding access log. More specifically, the path table 125 saves a correspondence relationship between the URI including the parameter and the component group (path) to be used when the request for that URI is executed. The parameter includes a key and a value of the key.

FIG. 6 is a diagram illustrating one example of the path table 125 according to this embodiment. The lines of the path table 125 illustrated in FIG. 6 correspond to the respective lines of the access log 122 illustrated in FIG. 3. For example, the first line of the path table 125 makes a correspondence between "1" denoting the path ID, a component group (path) "p1:p2:p3:p4", and a URI "http://foo.com/?fid=3&tab=2" including a parameter. Here, "fid=3&tab=2" is the parameter, "fid=" and "tab=" are keys, "3" and "2" are values of the respective keys "fid=" and "tab=". In the example illustrated in FIG. 6, the path ID "1" corresponds to the path "p1:p2:p3:p4", the path ID "2" corresponds to the path "p1:p4:p5:p7:p8", and the path ID "3" corresponds to the path "p3:p8:p9". Additionally, three URIs (access logs) with different parameters correspond to the path ID "1", two URIs (access logs) with different parameters correspond to the path ID "2", and one URI (access log) correspond to the path ID "3".

The parameter extracting unit 113 sorts out the identification parameter that identifies the path (that is, function/process) based on the path table 125, outputs the sorted-out identification parameter as the parameter table 126, and saves the identification parameter in the storage unit 120. The parameter extracting unit 113 includes a common-parameter extracting unit 113a and an identification-parameter extracting unit 113b. The procedure of the process (parameter-table creating process) by the parameter extracting unit 113 is described later with reference to FIG. 11 to FIG. 13.

The common-parameter extracting unit 113a extracts a common parameter in common between a plurality of request logs to be obtained when a request is executed by the function Fi that uses a plurality of components, from parameters of this plurality of request logs. More specifically, the common-parameter extracting unit 113a extracts a parameter in common between a plurality of URIs corresponding to the same path ID as the common parameter for each path ID (function Fi).

At this time, the common-parameter extracting unit 113a extracts the common parameter from parameters in a plurality of URIs based on the path table 125 created by the flow analyzing unit 112. The common-parameter extracting unit 113a extracts both a key and a value of this key as the common parameter regarding parameters with the key and the value that are in common among the parameters in the URIs. Furthermore, the common-parameter extracting unit 113a extracts a key alone as the common parameter regarding parameters that do not have the value of the key in common but have the key in common among the parameters in the URIs.

Figure 12:
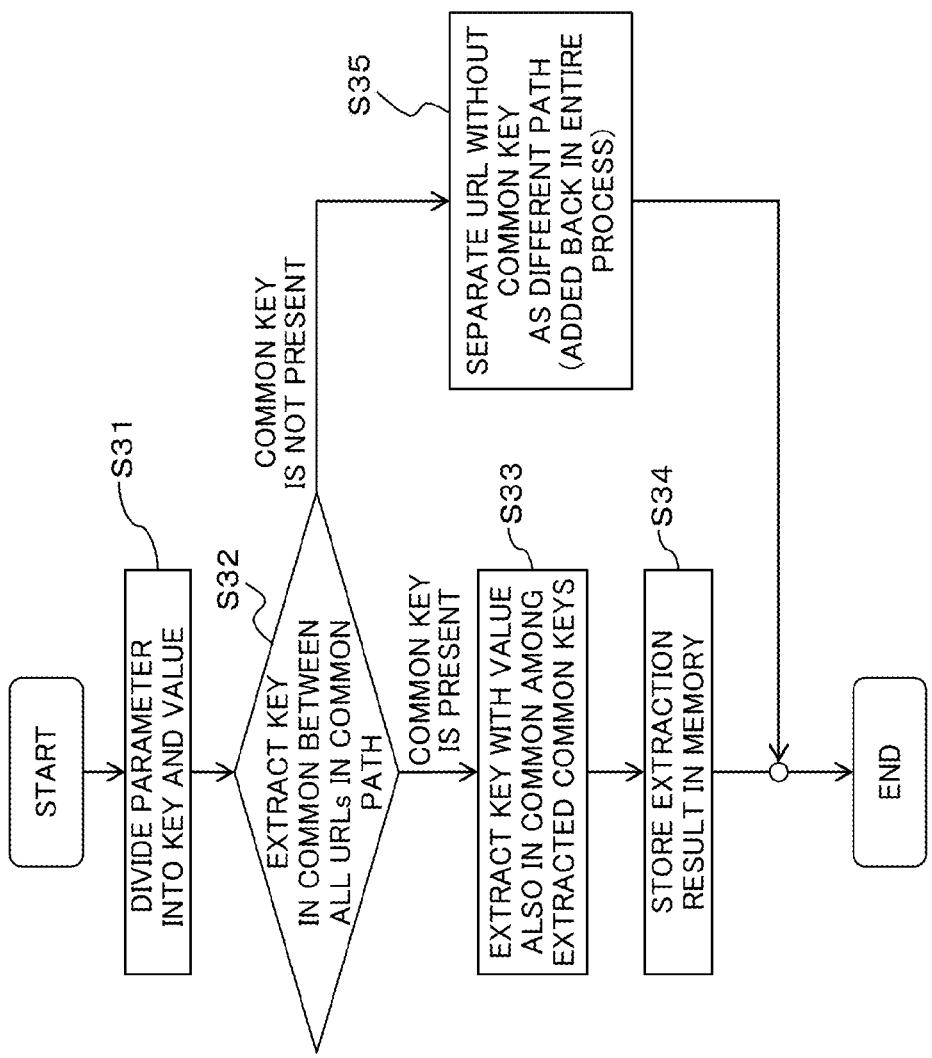
FIG. 12 is a flowchart describing a procedure of a common-parameter extracting process according to this embodiment.

Here, the procedure of the process by the common-parameter extracting unit 113a is described later with reference to FIG. 12. Additionally, the concrete example of the process by the common-parameter extracting unit 113a is described later with reference to FIG. 16.

The identification-parameter extracting unit 113b determines a common parameter different from the common parameter extracted from another function (a path ID different from a focused path ID) other than the function Fi among the common parameters extracted by the common-parameter extracting unit 113a, as the identification parameter that identifies the function Fi. At this time, the identification-parameter extracting unit 113b determines the minimum parameter or the minimum combination that identifies the function Fi (path/path ID) from the common parameters, as the identification parameter. The identification parameter determined by the identification-parameter extracting unit 113*b* is saved in the storage unit 120 as the parameter table 126.

Figure 13:
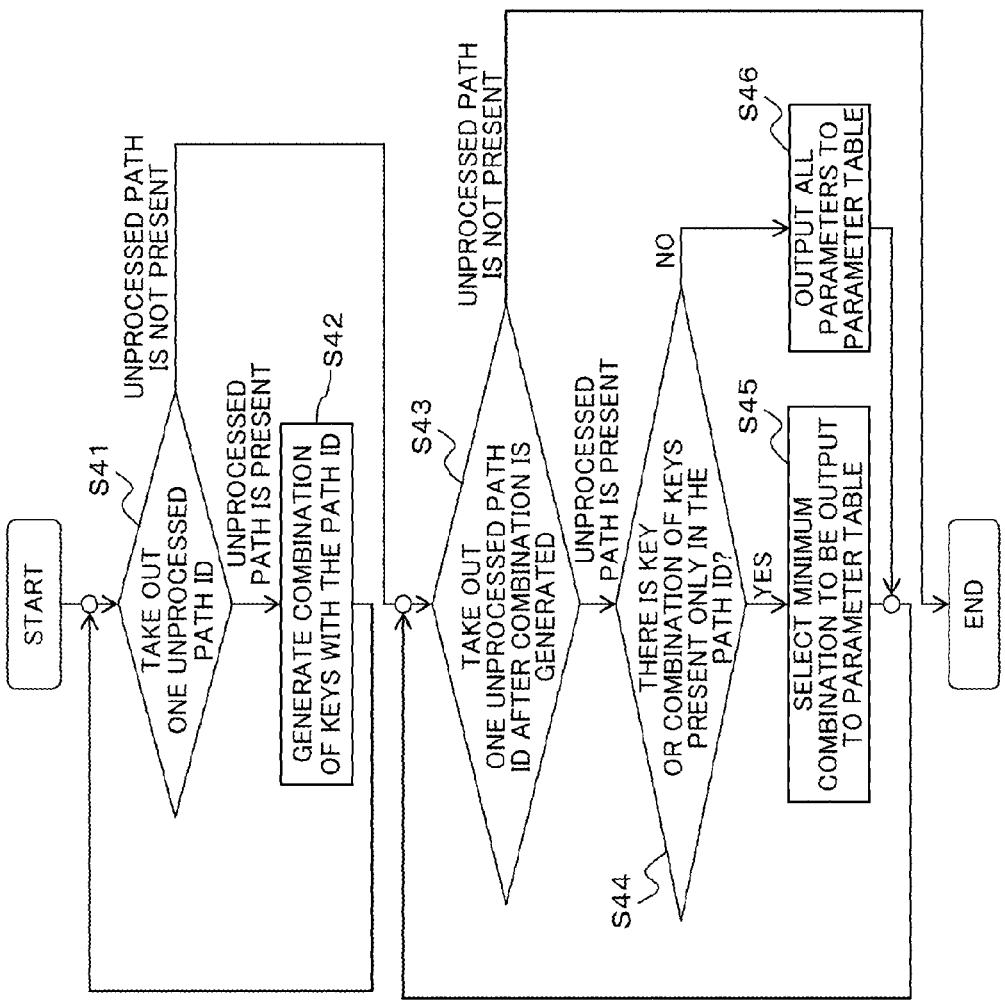
FIG. 13 is a flowchart describing a procedure of an identification-parameter extracting process according to this embodiment.

Here, the procedure of the process by the identification-parameter extracting unit 113*b* is described later with reference to FIG. 13. The concrete example of the process by the identification-parameter extracting unit 113*b* is described later with reference to FIG. 16.

Figure 16:
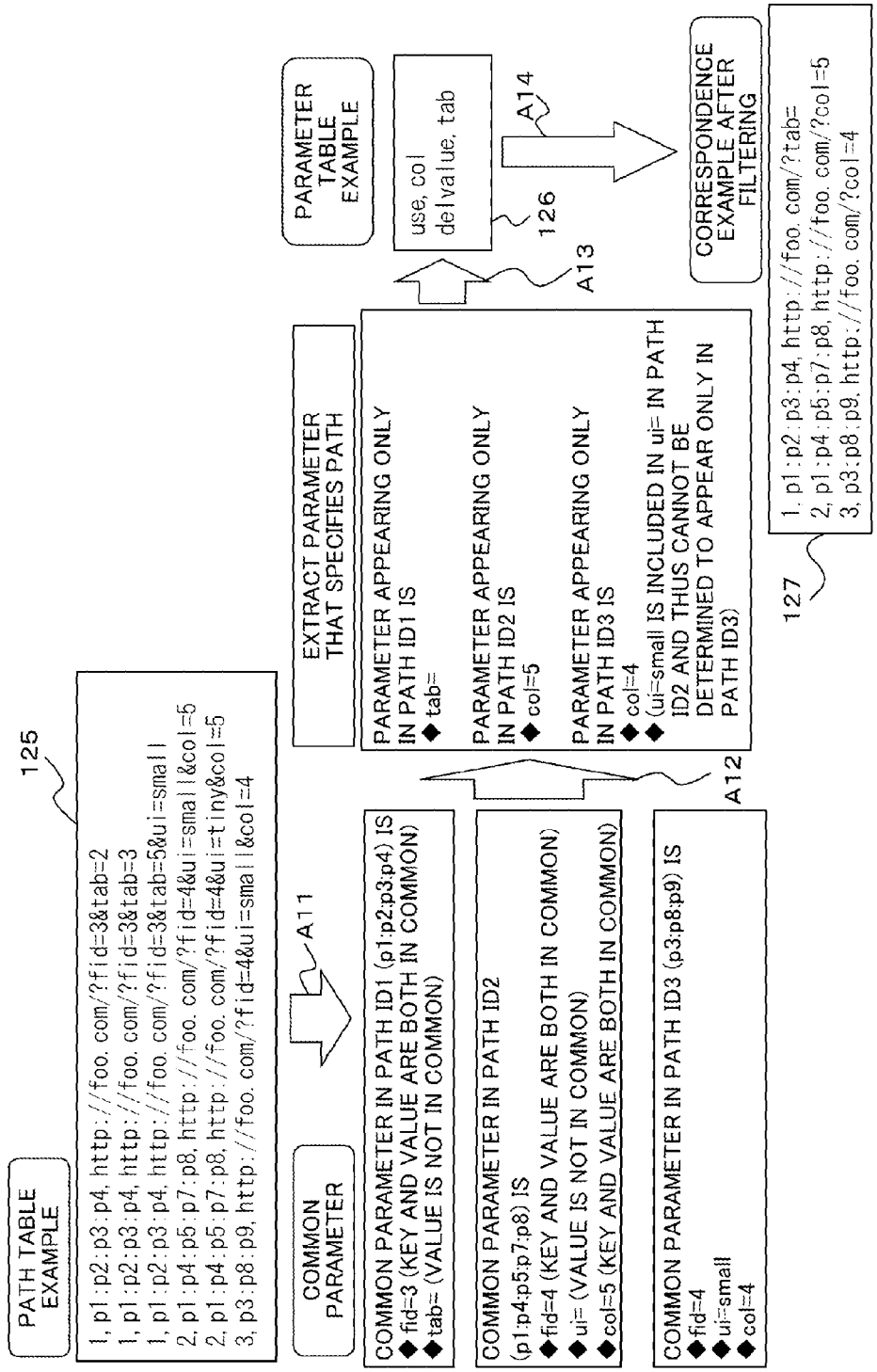
FIG. 16 is a diagram specifically describing the parameter extracting process and a parameter processing process according to this embodiment.

The parameter table 126 saves the minimum parameter that identifies the function Fi (path/path ID) in a key of a CGI parameter, a parameter of a POST method, and similar parameter. Here, for example, as illustrated in FIG. 16, a description will be given of the parameter table 126 in the case where the parameter identifying the path ID "1" (function F1) is "tab=", the parameter identifying the path ID "2" (function F2) is "col=5", and the parameter identifying the path ID "3" (function F3) is "col=4". In this case, the URI with the identification parameter "tab=" can be determined to correspond to the path ID "1" (function F1) irrespective of the value of "tab=." Additionally, the URI with the identification parameter "col=5" can be determined to correspond to the path ID "2" (function F2), and the URI with the identification parameter "col=4" can be determined to correspond to the path ID "3" (function F3).

Figure 7:
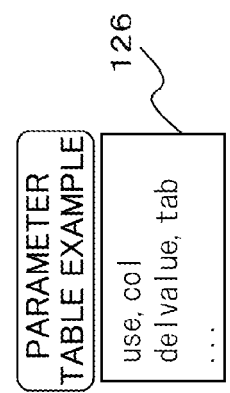
FIG. 7 is a diagram illustrating an exemplary parameter table according to this embodiment.

FIG. 7 is a diagram illustrating one example of the parameter table 126 according to this embodiment. The parameter table 126 illustrated in FIG. 7 collectively describes the identification parameters "tab=", "col=5", and "col=4" extracted as described above. The description "use, col" of the parameter table 126 provides an instruction for using both the key "col=" and the value "x" of the key as the path information regarding the parameter "col=x" with the key of "col=". The description "delvalue, tab" of the parameter table 126 provides an instruction for using the key "tab=" alone as the path information and discarding the value "y" of the key "tab=" regarding the parameter "tab=y".

The parameter processing unit 114 processes the path table 125 based on the identification parameter (the parameter table 126 in this embodiment) determined by the identification-parameter extracting unit 113*b*. The parameter processing unit 114 applies the parameter table 126 to the path table 125 and process the path table 125 to generate the path information 127 indicating a relationship between: the URI description (process) that includes the minimum necessary parameter; and the path ID (the plurality of components; the component group). The path information 127 obtained by the parameter processing unit 114 is saved in the storage unit 120. The concrete example of the process by the parameter processing unit 114 is described later with reference to FIG. 16.

FIG. 8 is a diagram illustrating one example of the path information 127 according to this embodiment. The path information 127 illustrated in FIG. 8 is obtained by applying the parameter table 126 illustrated in FIG. 7 to the path table 125 illustrated in FIG. 6 and processing the path table 125. That is, three URIs of the path ID "1" in FIG. 6 are collected together. The parameter description in the URI is rewritten as "tab=" alone by application of the parameter table 126 in FIG. 7. Additionally, two URIs of the path ID "2" in FIG. 6 are collected together. The parameter description in the URI is rewritten as "col=5" alone by application of the parameter table 126 in FIG. 7. Further, the parameter description in the URI of the path ID "3" in FIG. 6 is rewritten as "col=4" alone by application of the parameter table 126 in FIG. 7. Accordingly, the analysis apparatus 200 collates the URI+CGI parameter in the log data obtained during the actual operation with the path information 127. This can facilitate sorting out this log data by the corresponding path (function/process).

(2) Operation of this Embodiment

Next, with reference to FIG. 9 to FIG. 16, a description will be given of the operation in this embodiment.

(2-1) Outline of Operation of Analysis Apparatus According to this Embodiment

Firstly, a description will be given of the outline (point) of the operation of the analysis apparatus 100 according to this embodiment. The analysis apparatus 100 performs the operations described in the following items (a1) to (a3) as a basic operation.

(a1) The analysis apparatus 100 acquires the access log and the detail log when the request for the AP server 40 or similar server is executed for each request, performs the flow analysis based on the access log and the detail log, and categorizes the components in function units for each request. Here, "categorize in function units" means categorizing the component group (that is, the path) to be used for each request. For example, in the case where a request 1 causes the execution of the components p1, p2, p3, and p4, the "component group" categorized into the request 1 includes p1, p2, p3, and p4. Similarly, in the case where a request 2 causes the execution of the components p3, p8, and p9, the "component group" categorized into the request 2 includes p3, p8, and p9. The specific operation related to the item (a1) is described later with reference to FIG. 14 and FIG. 15.

(a2) The analysis apparatus 100 make a correspondence between the request log (access log/URI) and the function unit (component group/path). Accordingly, the analysis apparatus 100 creates the path table 125. The specific operation related to the item (a2) is described later with reference to FIG. 15.

(a3) The analysis apparatus 100 extracts the identification parameter that identifies the function unit (component group/path) from the parameter in the request log (access log/URI). The parameter is saved in the path table 125 created in the above-described item (a2). The specific operation related to the item (a3) is described later with reference to FIG. 16.

Generally, an ordinary hypertext transfer protocol (HTTP) log or similar log does not include information required for identifying the function, and it is difficult to sort out the parameter. In contrast, the analysis apparatus 100 of this embodiment allows categorizing the types of the use component group (function set; path) in the respective requests by the flow analysis in the above-described item (a2). That is, the analysis apparatus 100 of this embodiment can make a correspondence between each request and the function (process) so as to sort out the parameter (identification parameter) that characterizes the request.

For example, as described below, assume that three URIs with different parameters correspond to the respective function units "p1:p2:p3", "p1:p2:p3", and "p2:p4:p5". In this case, the parameter "fid=3" or "fid=2" is found to be a key (identification parameter) that discriminates the function unit "p1:p2:p3" and "p2:p4:p5" from each other.

http://foo.com/?fid=3&tab=2&uid=3523->p1:p2:p3 http://foo.com/?fid=3&tab=5&uid=9246->p1:p2:p3 http://foo.com/?fid=2&tab=2&uid=9246->p2:p4:p5

(2-2) Operation of Analysis Apparatus According to this Embodiment

Figure 9:
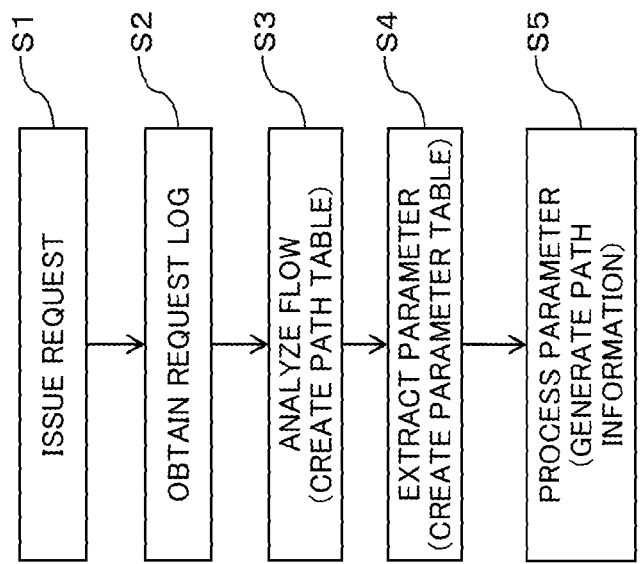
FIG. 9 is a flowchart describing an operation of the analysis apparatus according to this embodiment.

Next, a description will be given of the operation of the analysis apparatus 100 according to this embodiment in accordance with the flowchart (steps S1 to S5) illustrated in FIG. 9.

The analysis apparatus 100 instructs the user/request issuing unit 60 to issue a request in the pre-analysis phase so as to issue a request through the network 10 to the application 41 of the AP server 40 (see step S1). In the AP server 40 that has received the request, the process corresponding to this request is executed by the application 41, and then a request log corresponding to this request is output from the log output unit 42 to the analysis apparatus 100. Here, for example, the request is preliminarily prepared in the user-request database (not illustrated) or is issued by reproducing request data. The process for issuing the request is repeated until a predetermined termination condition is satisfied. Here, the request data can employ the data obtained during the actual operation or data generated as test data.

Subsequently, the log obtaining unit 111 receives and obtains, for each request, a request log that includes one access log 122 and a plurality of the detail logs 123 corresponding to the access log 122 from the log output units 42 of the AP server 40 and similar server (see step S2). At this time, the access log 122 and the detail log 123 to be obtained include contents in accordance with the log definition 121. The access log 122 and the detail log 123 obtained for each request by the log obtaining unit 111 are saved in the storage unit 120.

Subsequently, the flow analyzing unit 112 performs the flow analysis for each URI (request) based on the access log 122, the detail log 123, and the component definition 124 so as to create the path table 125 (see step S3). As described above, the path table 125 saves a correspondence relationship between a URI that includes a parameter and a component group (path) to be used when a request for the URI is executed. The parameter includes a key and a value of the key. The path table 125 created by the flow analyzing unit 112 is saved in the storage unit 120. The procedure in step S3, that is, the procedure of the process (path-table creating process) by the flow analyzing unit 112 is described later with reference to FIG. 10.

Subsequently, the parameter extracting unit 113 sorts out the identification parameter that identifies the path (function/process), based on the path table 125 created in step S3 (see step S4). The identification parameter sorted out by the parameter extracting unit 113 is output as the parameter table 126 and saved in the storage unit 120. The procedure in step S4, that is, the procedure of the process (parameter-table creating process) by the parameter extracting unit 113 is described later with reference to FIG. 11 to FIG. 13.

Subsequently, the parameter processing unit 114 applies the parameter table 126 created in step S4 to the path table 125 created in step S3 and processes the path table 125 so as to generate the path information 127 (see step S5). As described above, the path information 127 indicates the relationship between the URI description (process/function) that includes the minimum necessary parameter and the path ID (the plurality of components; the component group). The path information 127 obtained by the parameter processing unit 114 is saved in the storage unit 120.

Figure 10:
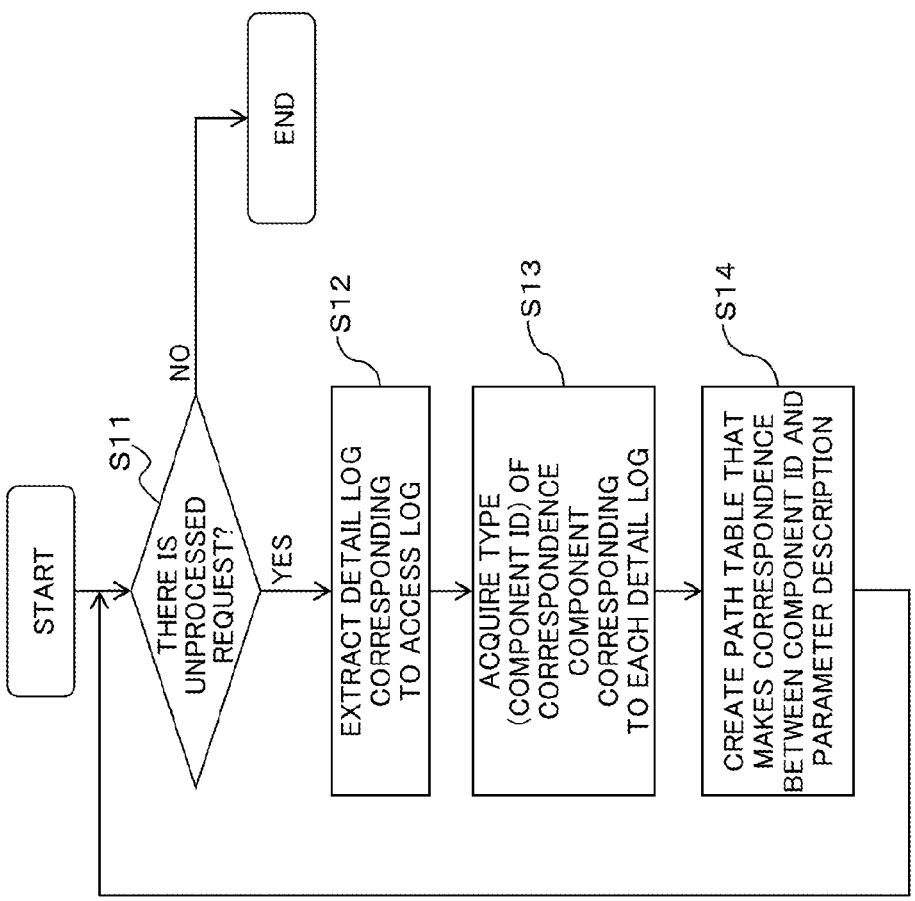
FIG. 10 is a flowchart describing a procedure of a flow analyzing process (path-table creating process) according to this embodiment.

(2-3) Procedure of Flow Analyzing Process (Path-Table Creating Process) According to this Embodiment Next, a description will be given of the procedure of the flow analyzing process (the path-table creating process; the process in step S3 of FIG. 9) according to this embodiment in accordance with the flowchart (step S11 to S14) illustrated in FIG. 10.

Firstly, the component-type acquiring unit 112a of the flow analyzing unit 112 refers to the access log 122 one by one to determine whether or not there is an unprocessed access log, that is, an unprocessed request (see step S11). In the case where there is an unprocessed request (see the YES route of step S11), the component-type acquiring unit 112a refers to one access log 122 of the unprocessed request. Subsequently, the component-type acquiring unit 112a extracts a plurality of the detail logs 123 corresponding to the access log based on the TranID of the access log (see step S12; see an arrow A1 in FIG. 14 and FIG. 15).

Subsequently, the component-type acquiring unit 112a acquires the type of the correspondence component corresponding to each detail log among the plurality of components based on the description included in each of the plurality of the extracted detail logs 123 (see step S13; see arrows A2 to A5 in FIG. 15). At this time, the component-type acquiring unit 112a acquires the type of the correspondence component using the component definition 124 preliminarily set in the storage unit 120 (see the arrows A3 and A4 in FIG. 15). Here, the type of the correspondence component is, for example, any one of p1, p2, . . . as the component ID.

Subsequently, the path-table creating unit 112b creates the path table 125 for each access log (request; URI; function/process) (see step S14). The path table 125 makes a correspondence between the component ID acquired by the component-type acquiring unit 112a and the description (parameter description) related to the parameter included in the corresponding access log (see arrows A6 and A7 in FIG. 15). Here, the component ID acquired by the component-type acquiring unit 112a is a component group (path) to be used when the request is executed, and the parameter description is a URI that includes a parameter in the access log.

When the process in step S14 is terminated, the flow analyzing unit 112 returns the process to step S11 to determine the existence of an unprocessed request. The process in steps S11 to S14 is repeatedly executed until it is determined that there is no unprocessed request in step S11. When it is determined that there is no unprocessed request (see the NO route of step S11), the flow analyzing unit 112 terminates the flow analyzing process.

(2-4) Procedure of Parameter Extracting Process (Parameter-Table Creating Process) According to this Embodiment Subsequently, a description will be given of the procedure of a parameter extracting process (parameter-table creating process; the process in step S4 of FIG. 9) according to this embodiment in accordance with the flowchart (steps S21 to S24) illustrated in FIG. 11.

Firstly, the common-parameter extracting unit 113a of the parameter extracting unit 113 refers to the path table 125 created in step S3 to determine whether or not there is an unprocessed path ID (see step S21). In the case where there is an unprocessed path ID (see the YES route of step S21), the common-parameter extracting unit 113a takes out one unprocessed path ID, that is, reads out information related to one unprocessed path ID from the path table 125 (see step S22).

Subsequently, the common-parameter extracting unit 113a executes a common-parameter extracting process described later with reference to FIG. 12 (see step S23; see an arrow A11 in FIG. 16). By the common-parameter extracting process, the common parameter is extracted for each path ID. When the process in step S23 is terminated, the parameter extracting unit 113 returns the process to step S21 to determine the existence of an unprocessed path ID. The process in steps S21 to S23 is repeatedly executed until it is determined that there is no unprocessed path ID in step S21.

When it is determined that there is no unprocessed path ID (see the NO route of step S21), the identification-parameter extracting unit 113b executes an identification-parameter extracting process described later with reference to FIG. 13 (see step S24). At this time, the identification-parameter extracting unit 113b executes the identification-parameter extracting process with respect to the common parameter obtained for each path ID by the common-parameter extracting unit 113a (see arrows A12 and A13 in FIG. 16). When the process in step S24 is terminated, the parameter extracting unit 113 terminates the parameter extracting process.

(2-4-1) Procedure of Common-Parameter Extracting Process According to this Embodiment In accordance with the flowchart (steps S31 to S35) illustrated in FIG. 12, a description will be given of the procedure of the common-parameter extracting process according to this embodiment (the process in step S23 of FIG. 11).

Figure 11:
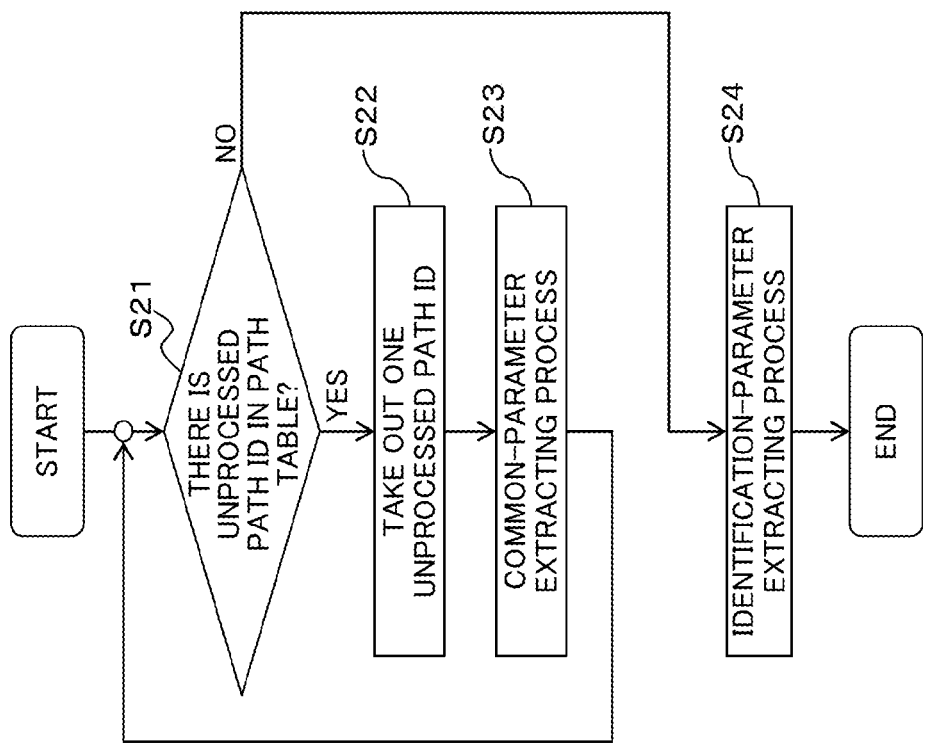
FIG. 11 is a flowchart describing a procedure of a parameter extracting process (parameter-table creating process) according to this embodiment.

Firstly, the common-parameter extracting unit 113a divides the parameter saved in the path table 125 into a key and a value regarding one path ID taken out in step S22 of FIG. 11 (see step S31). After the dividing, the common-parameter extracting unit 113a extracts the key in common between all the URIs corresponding to the path ID among the paths (components) with the path ID in common (see step S32).

In the case where a common key is extracted (the route of "COMMON KEY IS PRESENT" of step S32), the common-parameter extracting unit 113a extracts a key with a value in common from the extract common keys (see step S33). Subsequently, the common-parameter extracting unit 113a stores and saves the extracted result, that is, the common key and common value extracted in steps S32 and S33 in the storage unit (memory) 120 (see step S34), and then terminates the common-parameter extracting process.

With the process described above, the common parameter is extracted from the parameters in all the URIs corresponding to the path ID (see the arrow A11 in FIG. 16). That is, regarding the parameters that have both the key and the value of the key in common among the parameters in the URIs corresponding to the path ID, both the key and the value are extracted as the common parameter. Additionally, regarding the parameters that do not have the value of the key in common but have the key in common among the parameters in the URIs corresponding to the path ID, the key alone is extracted as the common parameter.

On the other hand, in the case where a common key is extracted (see the route of "COMMON KEY IS NOT PRESENT" of step S32), the common-parameter extracting unit 113a performs the following process. That is, the common-parameter extracting unit 113a sets mutually different path IDs to a plurality of URLs without a common key, separates the plurality of URLs without a common key as different paths, and adds the URLs back in the entire process (see step S35). Subsequently, the common-parameter extracting unit 113a terminates the common-parameter extracting process.

The common-parameter extracting process as described above is executed on all the respective paths saved in the path table 125.

(2-4-2) Procedure of Identification-Parameter Extracting Process According to this Embodiment In accordance with the flowchart (steps S41 to S46) illustrated in FIG. 13, a description will be given of the procedure of the identification-parameter extracting process (the process in step S24 of FIG. 11) according to this embodiment.

Firstly, the identification-parameter extracting unit 113b takes out one unprocessed path ID on which the identification-parameter extracting process has not been performed (see step S41). In the case where an unprocessed path ID is taken out (see the route of "UNPROCESSED PATH IS PRESENT" of step S41), the identification-parameter extracting unit 113b generates a combination of the common keys extracted as the common parameter regarding the taken-out path ID (see step S42). In the example described later with reference to FIG. 16, the common keys extracted for the path ID "1" are two of "fid=3" and "tab=", the combinations of the common keys are three sets of "fid=3" alone, "tab=" alone, and both "fid=3" and "tab=".

When the process in step S42 is terminated, the identification-parameter extracting unit 113b returns the process to step S41 and takes out one unprocessed path ID. The process in steps S41 and S42 is repeatedly executed until the unprocessed path ID is not taken out in step S41.

In the case where an unprocessed path ID is not taken out (see the route "UNPROCESSED PATH IS NOT PRESENT" of step S41), the identification-parameter extracting unit 113b takes out one unprocessed path ID to which the following process has not been performed after the combination is generated (see step S43). In the case where an unprocessed path ID is taken out (see the route of "UNPROCESSED PATH IS PRESENT" of step S43), the identification-parameter extracting unit 113b determines whether or not there is a common key or a combination of common keys present only in the taken-out path ID (see step S44).

In the case where there is a common key or a combination of common keys (see the YES route of step S44), the identification-parameter extracting unit 113b selects one minimum combination from the common key or the combination of the common keys (see the arrow A12 in FIG. 16). Subsequently, the identification-parameter extracting unit 113b outputs the parameter related to the selected combination as the identification parameter and saves the parameter in the parameter table 126 (see step S45; see the arrow A13 in FIG. 16). For example, as described above, in the case where the combinations of the common keys are three sets of "fid=3" alone, "tab=" alone, and both "fid=3" and "tab=", the minimum parameter (key) "tab=" is selected as the identification parameter.

On the other hand, in the case where there is no common key or combination of common keys (see the NO route in step S44), the identification-parameter extracting unit 113b outputs all the parameters related to the common key to the parameter table 126 as the identification parameter and saves the parameters (see step S46).

When the process in step S45 or step S46 is terminated, the identification-parameter extracting unit 113b returns the process to step S43 to take out one unprocessed path ID after the combination is generated. The process steps S43 to S46 is repeatedly executed until the unprocessed path ID is not taken out in step S43. In the case where an unprocessed path ID has not been takes out (see the route of "UNPROCESSED PATH IS NOT PRESENT" of step S43), the identification-parameter extracting unit 113b terminates the identification-parameter extracting process.

With the process described above, a common parameter different from (not overlapped with) a common parameter extracted for another path ID other than the focused path ID (function Fi) among the common parameters extracted by the common-parameter extracting unit 113a is determined as the identification parameter that identifies the focused path ID. At this time, the minimum parameter or the minimum combination that identifies the function Fi (path/path ID) is determined as the identification parameter from the common parameters.

(2-5) Concrete Example of Flow Analyzing Process According to this Embodiment

Next, with reference to FIG. 14 and FIG. 15, a description will be given of the concrete example of the flow analyzing process (the process in step S3 in FIG. 9) according to this embodiment. Here, FIG. 14 and FIG. 15 are diagrams specifically describing the flow analyzing process according to this embodiment.

Figure 14:
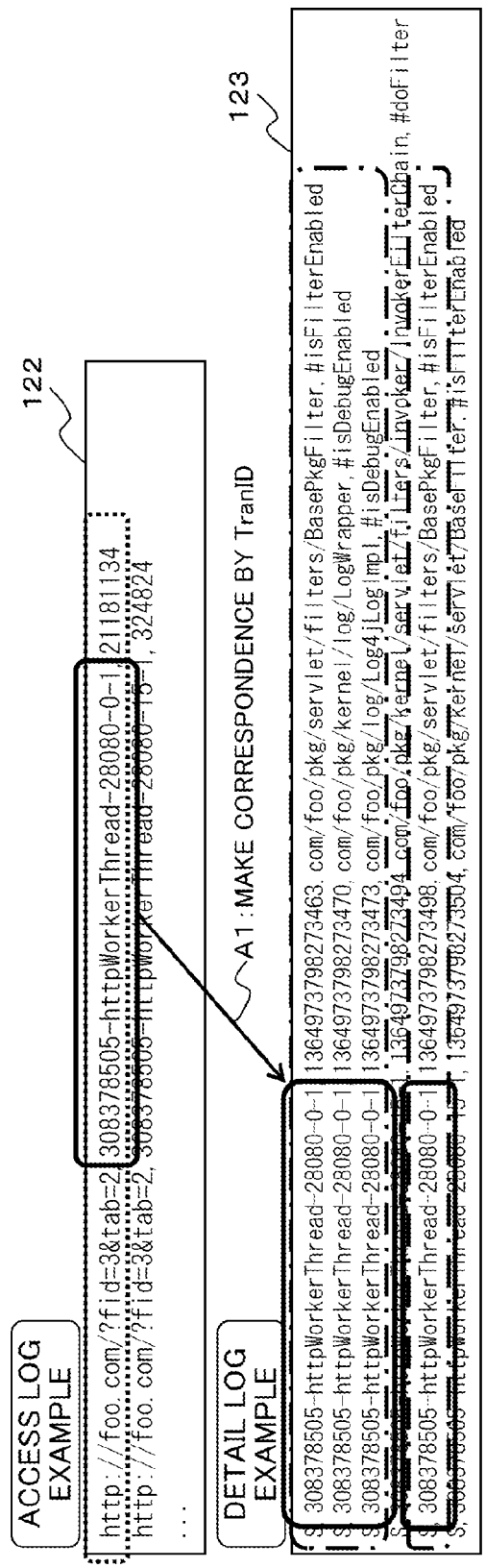
FIG. 14 and FIG. 15 are diagrams specifically describing the flow analyzing process according to this embodiment.
Figure 15:
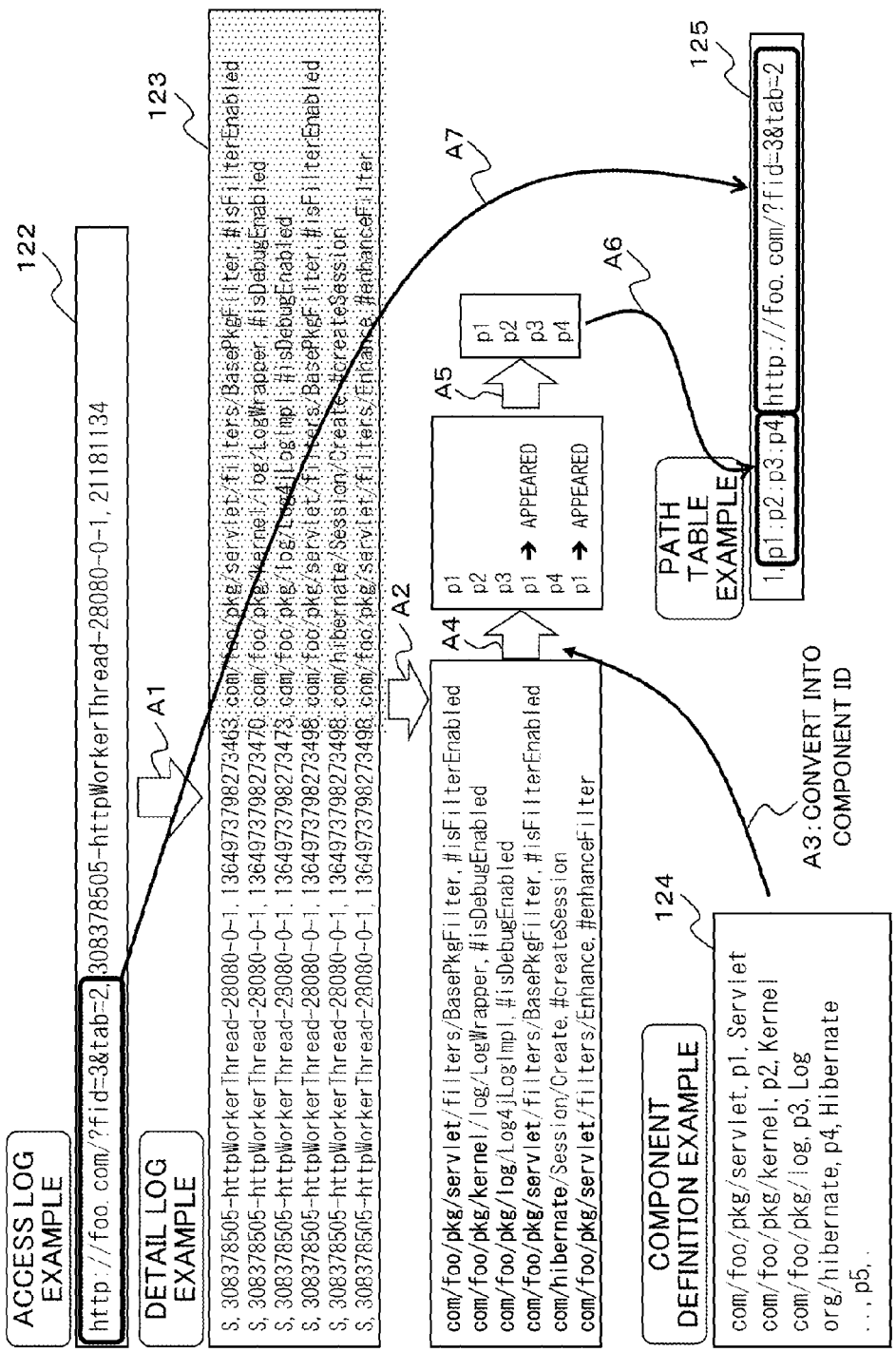

As illustrated in FIG. 14 and FIG. 15, when one unprocessed access log is taken out, the component-type acquiring unit 112a extracts a plurality of detail logs with the same TranID as a TranID "308378505-httpWorkerThread-28080-0-1" of this access log (focused access log) (see the arrow A1). Here, FIG. 14 illustrates the example where four detail logs are extracted for the focused access log. FIG. 15 illustrates the example where six detail logs are extracted for the focused access log.

As illustrated in FIG. 15, the component-type acquiring unit 112a extracts the description other than the TranID (see the shaded area in the detail log example in FIG. 15) from the respective six detail logs (see the arrow A2). Subsequently, the component-type acquiring unit 112a converts the above description of each detail log into the component ID based on the component definition 124 (see the arrows A3 and A4) to acquire the type (component ID) of the correspondence component corresponding to each detail log.

The component definition 124 illustrated in FIG. 15 is similar to the component definition 124 described above with reference to FIG. 5. That is, in the component definition 124, the component definition 124 is set such that the description "com/foo/pkg/servlet" of the detail log 123 corresponds to the component p1 and the description "com/foo/pkg/kernel" of the detail log 123 corresponds to the component p2. Additionally, the component definition 124 is set such that the description "com/foo/pkg/log" of the detail log 123 corresponds to the component p3 and the description "org/hibernate/Session" of the detail log 123 corresponds to the component p4.

Accordingly, the respective descriptions extracted from the six detail logs are converted into the component IDs "p1", "p2", "p3", "p1", "p4", and "p1" (see the arrow A4). At this time, the component ID "p1" appears three times. Therefore, as the component group corresponding to the focused access log (focused URI), four component IDs "p1", "p2", "p3", and "p4" are extracted (see the arrow A5).

Subsequently, a correspondence is made between: the four component IDs "p1", "p2", "p3", and "p4" corresponding to the extracted focused access log (focused URI); and the URI "http://foo.com/?fid=3&tab=2" that includes the parameter description in the focused access log, and is registered in the path table 125 (see the arrows A6 and A7). The above-described process is executed for each access log (URI) so as to create the path table 125 as illustrated in FIG. 6, FIG. 15, and FIG. 16.

The path table 125 illustrated in FIG. 16 is similar to the path table 125 described above with reference to FIG. 6. That is, the lines of the path table 125 illustrated in FIG. 16 correspond to the respective lines of the access log 122 illustrated in FIG. 14 and FIG. 15. For example, the first line of the path table 125 makes a correspondence between "1" denoting the path ID, a component group (path) "p1:p2:p3: p4", and a URI "http://foo.com/?fid=3&tab=2" including a parameter. Here, "fid=3&tab=2" is the parameter, "fid=" and "tab=" are keys, "3" and "2" are values of the respective keys "fid=" and "tab=". Also in the example illustrated in FIG. 16, the path ID "1" corresponds to the path "p1:p2: p3:p4", the path ID "2" corresponds to the path "p1:p4:p5: p7:p8", and the path ID "3" corresponds to the path "p3: p8:p9". Additionally, the path ID "1" corresponds to three URIs (access logs) with different parameters, the path ID "2" corresponds to two URIs (access logs) with different parameters, and the path ID "3" corresponds to one URI (access log).

Here, although the parameters have the key in common but does not have the value of the key in common, the common-parameter extracting unit 113a may learn the appearance frequencies and the variations of the respective values so as to determine that the values of the keys in the parameters are limited types of values or random values and reflect the determination result to the extraction of the common parameter. The correspondence example in the case where the keys appearing in the parameters within one function do not have a common value (in the case where a plurality of different values appears for the same key) is described later with reference to FIG. 17 and FIG. 18 as a first modification of this embodiment. Additionally, the correspondence example in the case where a common key does not appear in the parameters within one function is described later with reference to FIG. 17 and FIG. 19 as a second modification of this embodiment.

(2-6) Concrete Examples of Parameter Extracting Process and Parameter Processing Process According to this Embodiment Next, with reference to FIG. 16, a description will be given of the concrete examples of the parameter extracting process (the process in step S4 of FIG. 9) and a parameter processing process (the process in step S5 of FIG. 9) according to this embodiment. Here, FIG. 16 is a diagram specifically describing the parameter extracting process and the parameter processing process according to this embodiment.

As illustrated in FIG. 16, the common-parameter extracting unit 113a refers to the path table 125 to extract the parameter in common between a plurality of URIs corresponding to the same path ID as the common parameter for each path ID (function Fi) (see the arrow A11). For example, the parameters in common between three URIs corresponding to the path ID "1" are two of "fid=3" (where both the key and the value are in common) and "tab=" (where the key is in common but the value is not in common). Additionally, the parameters in common between two URIs corresponding to the path ID "2" are three of "fid=4"(where both the key and the value are in common), "ui=" (where the key is in common but the value is not in common), and "col=5" (where both the key and the value are in common). Furthermore, from one URI corresponding to the path ID "3", all the parameters of "fid=4", "ui=small", and "col=4" included in the URI are extracted as the common parameter.

The identification-parameter extracting unit 113b determines a common parameter that does not overlap with the common parameter extracted with respect to a path ID other than the focused path ID among the common parameters extracted as described above, as the identification parameter that identifies the focused path ID (function Fi) (see the arrow A12). In the example illustrated in FIG. 16, the minimum common parameter among the common parameters that appear only in the path ID "1" but do not appear in the path ID "2" or "3" is "tab=", this "tab=" is extracted as the identification parameter that identifies the path ID "1". Similarly, the minimum common parameter among the common parameters that appear only in the path ID "2" but do not appear in the path ID "1" or "3" is "col=5", this "col=5" is extracted as the identification parameter that identifies the path ID "2". Additionally, the minimum common parameter among the common parameters that appear only in the path ID "3" but do not appear in the path ID "1" or "2" is "col=4", this "col=4" is extracted as the identification parameter that identifies the path ID "2". Here, since the parameter "ui=small" that appears in the path ID "3" is included in the parameter "ui=" that appears in the path ID "2", this parameter is not the parameter that appears only in the path ID "3" and thus excluded.

While the identification parameters "tab=", "col=5", and "col=4" extracted as described above may be directly registered and saved in the parameter table 126, these parameters are registered and saved similarly to the path table 125 described above with reference to FIG. 7 in the parameter table 126 illustrated in FIG. 16 (see the arrow A13). That is, in the parameter table 126, the identification parameters "tab=", "col=5", and "col=4" are collectively described. As described above, the description "use, col" of the parameter table 126 provides an instruction for using both the key "col=" and the value of the key "x" as the path information regarding the parameter "col=x" with the key of "col=". Additionally, the description "delvalue, tab" of the parameter table 126 provides an instruction for using the key "tab=" alone as the path information and discarding the value "y" of the key "tab=" regarding the parameter "tab=y".

The parameter processing unit 114 performs filtering processing of the path table 125 based on the parameter table 126 obtained as described above (see an arrow A14). That is, the parameter processing unit 114 applies the parameter table 126 to the path table 125 and processes the path table 125 so as to generate the path information 127 indicating the relationship between the URI description (process) that includes the minimum necessary parameter and the path ID (component group). Also in the example illustrated in FIG. 16, similarly to the above-described example with reference to FIG. 6 and FIG. 8, the three URIs of the path ID "1" are collected together, and the parameter descriptions in the URIs are subjected to the application of the parameter table 126 in FIG. 16 to be rewritten as "tab=" only. Additionally, the two URIs of the path ID "2" are collected together, and the parameter descriptions in the URIs are subjected to the application of the parameter table 126 in FIG. 16 to be rewritten as "col=5" only. Furthermore, the parameter description in the URI of the path ID "3" are subjected to the application of the parameter table 126 in FIG. 7 to be rewritten as "col=4" only.

(3) Effects of this Embodiment

The analysis apparatus 100 of this embodiment extracts a common parameter in common between a plurality of the request logs obtained when a request is executed by each function Fi that uses the plurality of components p1, p2, . . . , from the parameters in this plurality of request logs. Among the common parameters extracted for each function Fi, the common parameter different from the common parameter extracted for the other function other than the function Fi is determined as the identification parameter that identifies the function Fi. Thus, in the analysis apparatus 100, even when the URI includes the user ID and similar information as the parameter, an appropriate parameter that can identify the function Fi is identified from the request log obtained when the function Fi is executed. This allows accurately categorizing the function Fi. Accordingly, in the application program, the network service, and similar application, the data amount of the path information 127 to be used by the analysis apparatus 200 for identifying the problematic part during the actual operation can be considerably reduced.

When the analysis apparatus 200 performs an analysis (identification of the problematic part) during the actual operation, it is desired to remove an unnecessary parameter for identifying the function (path/component group) from the URI due to the limitation of the analysis time and the analysis resource. At that time, when the information required for identifying the function is erroneously removed, the analysis does not function effectively. Therefore, it is desired to sort out the minimum necessary parameter for identifying the function. However, the ordinary HTTP log or similar log does not include the information required for identifying the function and it is difficult to sort out the parameter. Accordingly, the determination by the operator or similar person is desired for the sorting work of the parameter, and this becomes an obstacle to introducing the analysis system. Thus, the automation of the parameter selection is preferred.

In contrast, the analysis apparatus 100 of this embodiment allows categorizing the types of the used component groups (paths) in the respective requests. That is, the analysis apparatus 100 of this embodiment can make a correspondence between each request and the function (process) so as to sort out the parameter that characterizes the request (URI, path ID). Accordingly, the analysis apparatus 100 of this embodiment can automatically sort out the function and the parameter for analysis (identification of the problematic part) so as to realize correct establishment of the analysis environment and shortening of the preparation period for the analysis environment.

Furthermore, the path information 127 obtained by the analysis apparatus 100 of this embodiment includes the minimum necessary parameter. This does not only reduce the data amount of the path information 127 but also ensures significant shortening of the analysis time for identifying the problematic part by the analysis apparatus 200 during the actual operation. That is, the analysis apparatus 200 can collate the URI+CGI parameter in the log data obtained during the actual operation with the path information 127 so as to sort out the log data by the corresponding path (function/process) simplify and in a short time.

In the parameter table 126 of this embodiment, for example, using the description such as "use, col" and "delvalue, tab" allows collectively describing the information (the information related to the identification parameter) related to the minimum necessary parameter to be extracted from the path table 125. Accordingly, compared with the case where the identification parameter is simply registered on the parameter table 126, the data amount of the parameter table 126 can be considerably reduced.

(4) Modification (4-1) First Modification

The first modification of this embodiment is a correspondence example in the case where the keys appearing in the parameters within one function do not have a common value (in the case where a plurality of different values appears for the same key). In the first modification, even in the case where a plurality of different values (for example, ui=100, ui=80, and similar value) appears for the same key, in the case where a random value does not appear and only a constant value appears as the value of the key, the constant "value of key" is extracted as a candidate (common parameter) of the parameter that identifies the function.

Figure 17:
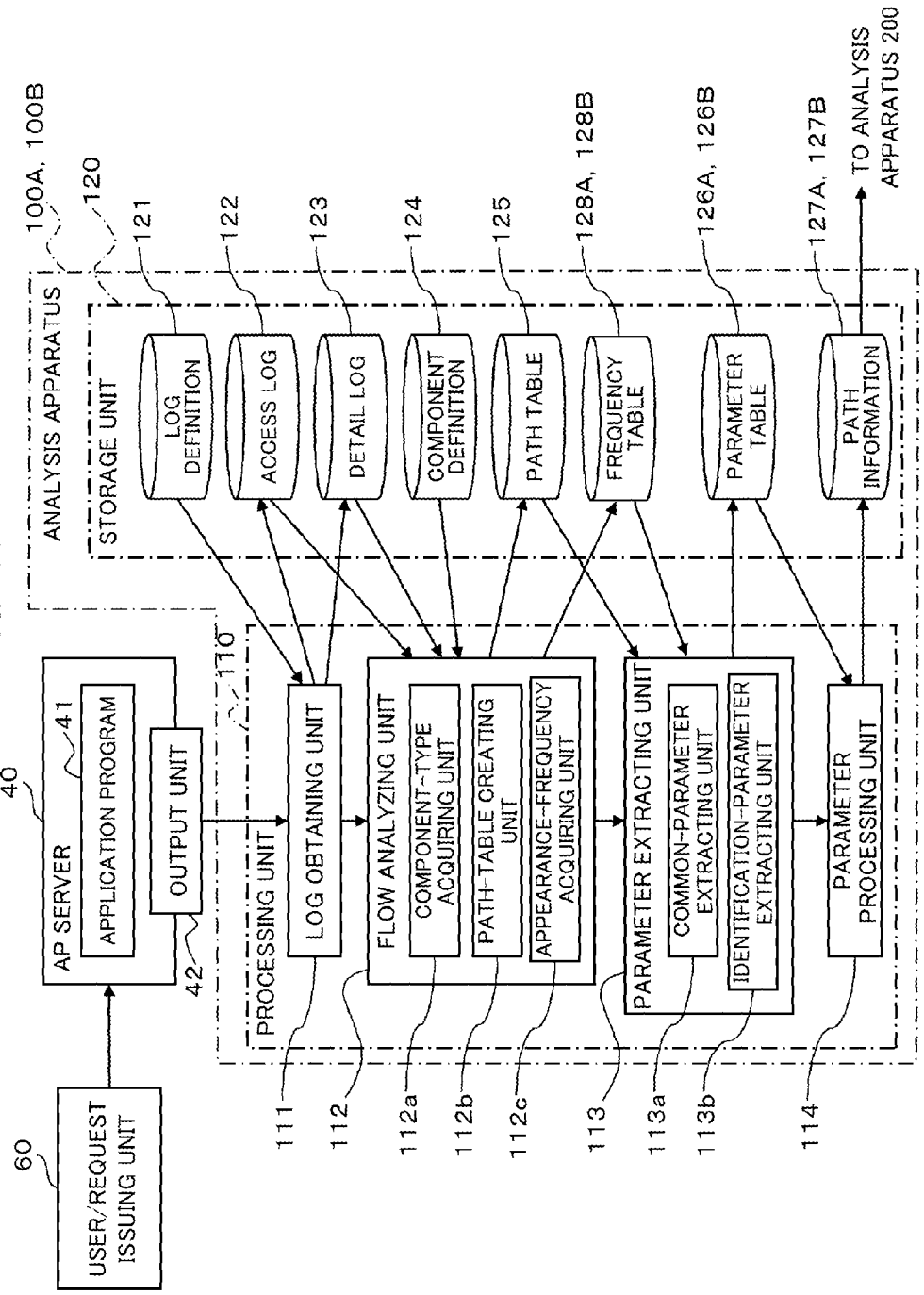
FIG. 17 is a block diagram illustrating a hardware configuration and a functional configuration of an analysis apparatus in first and second modifications.
Figure 18:
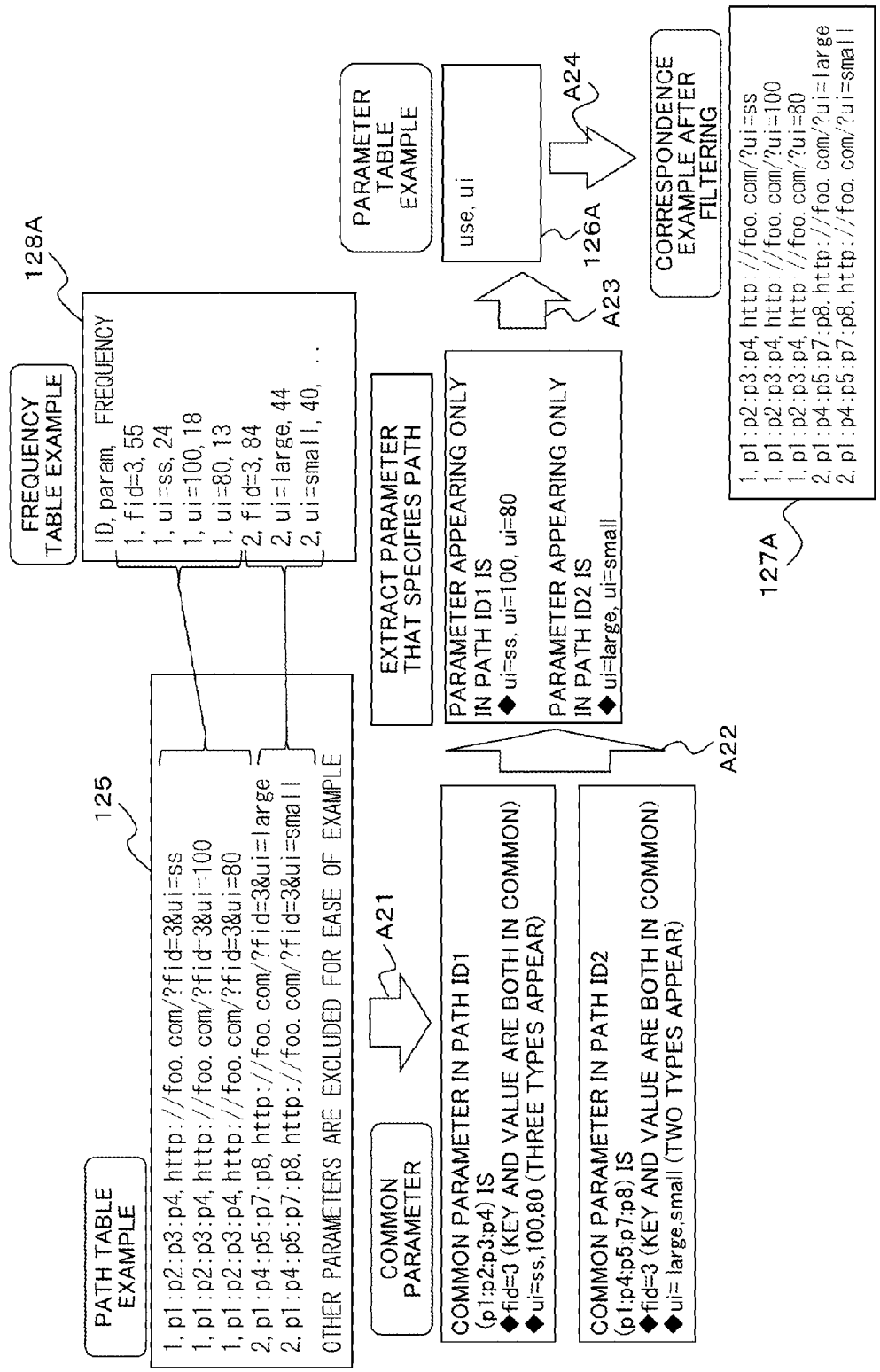
FIG. 18 is a diagram specifically describing a parameter extracting process and a parameter processing process in the analysis apparatus of the first modification.

The following describes the first modification of this embodiment with reference to FIG. 17 and FIG. 18. Here, FIG. 17 is a block diagram illustrating a hardware configuration and a functional configuration of an analysis apparatus 100A of the first modification. FIG. 18 is a diagram specifically describing a parameter extracting process and a parameter processing process in the analysis apparatus 100A of the first modification. Like reference numerals designate corresponding or identical elements throughout the drawings, and therefore such elements will not be further elaborated here.

Figure 2:
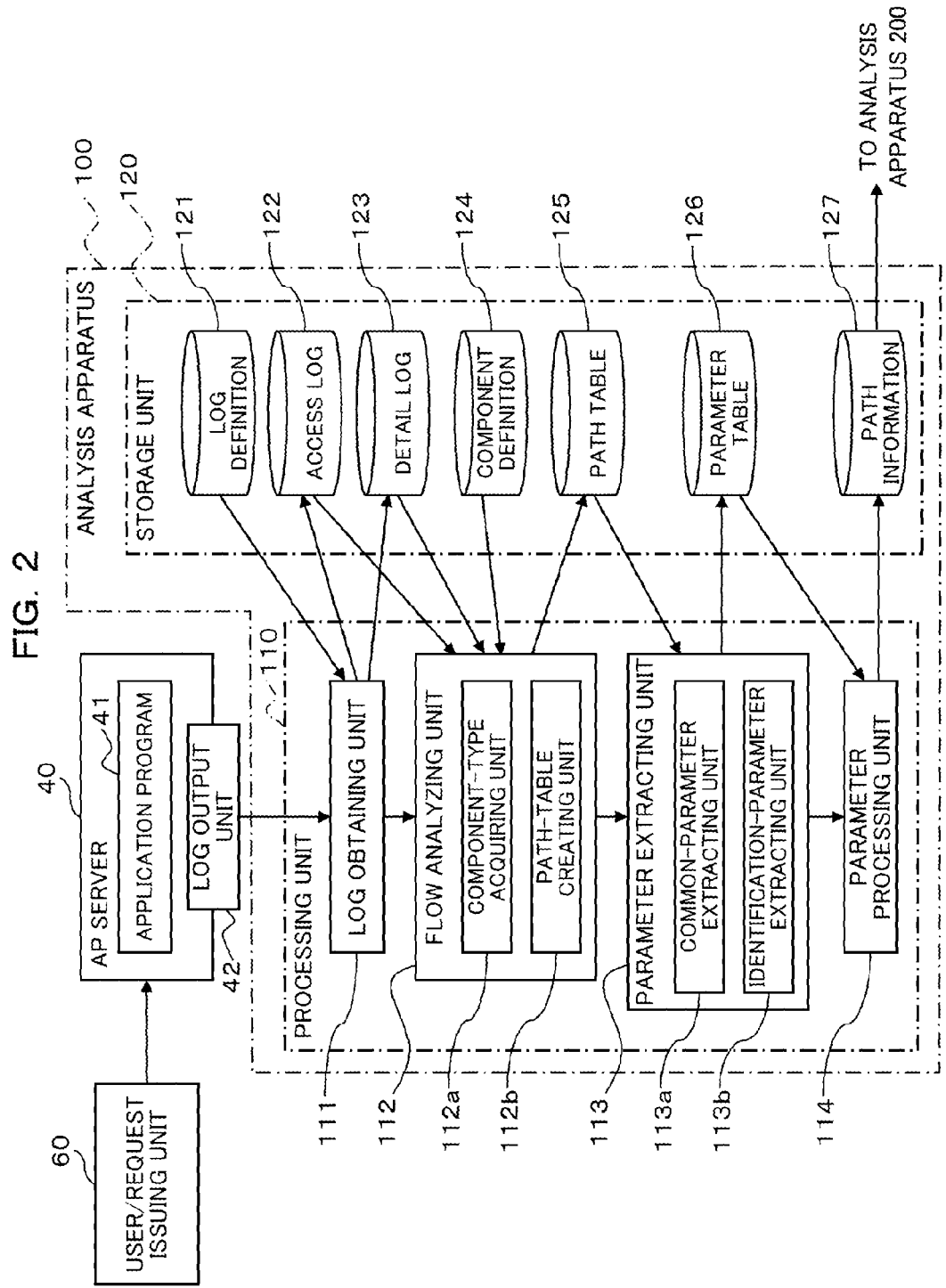
FIG. 2 is a block diagram illustrating a hardware configuration and a functional configuration of the analysis apparatus according to this embodiment.

As illustrated in FIG. 17, the analysis apparatus 100A of the first modification is constituted similarly to the analysis apparatus 100 of this embodiment illustrated in FIG. 2. However, in the analysis apparatus 100A of the first modification, an appearance-frequency acquiring unit 112c is newly added to the flow analyzing unit 112 and a frequency table 128A is newly added to the storage unit 120. In the storage unit 120, a parameter table 126A and path information 127A are saved instead of the parameter table 126 and the path information 127.

The appearance-frequency acquiring unit 112c of the first modification acquires the appearance frequency of each parameter within a plurality of the access logs 122 (request logs) for each path ID. The acquired appearance frequency is made to correspond to the parameter description "key=value" for each path ID as illustrated in FIG. 18, and then is saved in the frequency table 128A. Here, in the example illustrated in FIG. 17, the appearance-frequency acquiring unit 112c is included in the flow analyzing unit 112 of the processing unit 110. The example is not limited to this.

In the case where the appearance frequency acquired with respect to the parameters that do not have the value in common but have the key in common among the parameters in the plurality of the access logs 122 (URIs) is higher than a predetermined threshold, the common-parameter extracting unit 113a of the first modification extracts both the key and the value as the common parameter. In the case where the appearance frequency is low, the common-parameter extracting unit 113a of the first modification extracts the key alone as the common parameter.

Next, with reference to FIG. 18, a description will be given of the operations of the appearance-frequency acquiring unit 112c, the common-parameter extracting unit 113a, and the identification-parameter extracting unit 113b of the first modification, and the parameter table 126A and the path information 127A of the first modification.

As illustrated in FIG. 18, in the first modification, the frequency table 128A is created by the appearance-frequency acquiring unit 112c. That is, the appearance frequency of each parameter appearing in the URI of the path table 125 is acquired for each path ID and saved as the frequency table 128A. In the frequency table 128A illustrated in FIG. 18, "55" is acquired as the appearance frequency of the parameter "fid=3" in the URI of the path ID "1", and "24" is acquired as the appearance frequency of the parameter "ui=ss" in the URI of the path ID "1". Additionally, "18" is acquired as the appearance frequency of the parameter "ui=100" in the URI of the path ID "1", and "13" is acquired as the appearance frequency of the parameter "ui=80" in the URI of the path ID "1". Similarly, "84" is acquired as the appearance frequency of the parameter "fid=3" in the URI of the path ID "2", and "44" is acquired as the appearance frequency of the parameter "ui=large" in the URI of the path ID "2", and "40" is acquired as the appearance frequency of the parameter "ui=small" in the URI of the path ID "2".

The common-parameter extracting unit 113a refers to the path table 125 and the frequency table 128A to extract the parameter in common between a plurality of URIs corresponding to the same path ID for each path ID as the common parameter (see an arrow A21). At this time, in the case where the appearance frequency acquired with respect to the parameters that do not have the value in common but have the key in common is higher than a predetermined threshold, the common-parameter extracting unit 113a extracts both the key and the value as the common parameter (see the arrow A21). Here, the high or low level of the appearance frequency may be determined by comparison between the appearance frequency and the predetermined threshold (the number) or may be determined by comparison between: the proportion of the appearance frequency to the total number; and a predetermined threshold (proportion). Here, the appearance frequencies in the frequency table 128A illustrated in FIG. 18 are all determined to be higher than the predetermined threshold.

At this time, in the example illustrated in FIG. 18, the common-parameter extracting unit 113a extracts the following common parameters. That is, the parameters in common between three URIs corresponding to the path ID "1" are four parameters including: "fid=3" (both the key and the value are in common); and three parameters "ui=ss, 100, 80" with the appearance frequencies higher than the predetermined threshold. The parameters in common between two URIs corresponding to the path ID "2" are three parameters including: "fid=3" (both the key and the value are in common); and two parameters "ui=large, small" with the appearance frequencies higher than the predetermined threshold.

Here, if the appearance frequencies of "ui=ss," "ui=100", and similar parameter are low (lower than the predetermined threshold), the common-parameter extracting unit 113a determines that the value of the key "ui=" is not a specific value "ss" or "100", but an indefinite variable and extracts the key (ui=) alone as the common parameter.

In the case where a large number of different values with the low appearance frequencies in the same key are obtained during counting the appearance frequency, the counting for this key is terminated in its course. Then, the common-parameter extracting unit 113a determines that the value of this key is an indefinite variable and extracts the key alone as the common parameter.

Furthermore, for example, in the case where a common value appears as the value of "ui=" in the path ID "1" and the path ID "2", for example, in the case where "ui=medium" appears in both, the common-parameter extracting unit 113a may extract the common value alone as the common parameter in both paths. Alternatively, in this case, the common-parameter extracting unit 113a may ignore the case of the common value.

Then, the identification-parameter extracting unit 113b determines the common parameter that does not overlap with the common parameter extracted with respect to the path ID other than the focused path ID among the common parameters extracted as described above, as the identification parameter that identifies the focused path ID (see the arrow A22). In the example illustrated in FIG. 18, the common parameters that appear only in the path ID "1" and do not appear in the path ID "2" are "ui=ss", "ui=100", and "ui=80", and these common parameters are extracted as the identification parameter. Similarly, the common parameters that appear only in the path ID "2" and do not appear in the path ID "1" are "ui=large" and "ui=small", and these common parameters are extracted as the identification parameter.

With reference to FIG. 16, in the above-described embodiment, in this phase for extracting the identification parameter, "ui" has the key alone in both the path ID "1" and the path ID "2", and thus there is no parameter that identifies the path. In contrast, in the first modification, in the case where it is found that only some types of parameters with different values appear based on the appearance-frequency information (the frequency table 128A), the common-parameter extracting unit 113a processes a plurality of parameters in which a plurality of different values appears with respect to the same key, as the common parameter.

The identification parameters "ui=ss", "ui=100", "ui=80", "ui=large", and "ui=small" extracted as described above are collectively described as "use, ui" in the parameter table 126A illustrated in FIG. 18 (see an arrow A23).

Then, the parameter processing unit 114 performs filtering processing of the path table 125 based on the parameter table 126A obtained as described above (see an arrow A24). That is, the parameter processing unit 114 applies the parameter table 126A to the path table 125 and processes the path table 125 so as to generate the path information 127A indicating the relationship between the URI description (process) that includes the minimum necessary parameter and the path ID (component group). In the example illustrated in FIG. 18, the lines of the path information 127A correspond to the respective lines of the path table 125 and are rewritten as the description where "fid=3&" is deleted in the respective lines in the path table 125.

(4-2) Second Modification

The second modification of this embodiment is the correspondence example in the case where a common key does not appear in the parameters within one function. In the second modification, even in the case where a common key does not appear in the parameters within one function, in the case where only a certain combination of a plurality of parameters "key=value" appears, the certain combination of the parameters "key=the value" is extracted as a candidate (common parameter) of the parameter that identifies the function.

Figure 19:
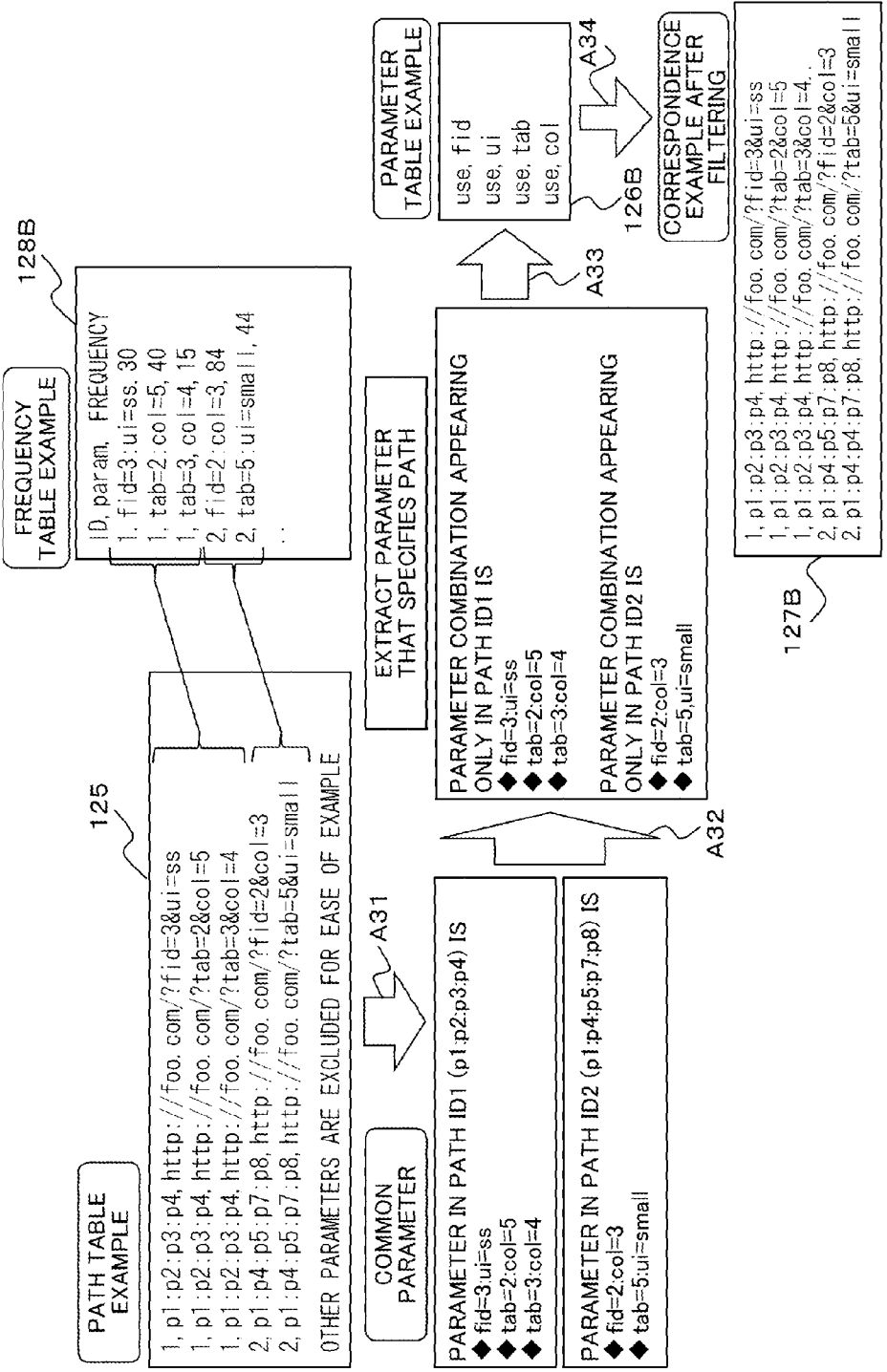
FIG. 19 is a diagram specifically describing a parameter extracting process and a parameter processing process in the analysis apparatus of the second modification.

The following describes the second modification of this embodiment with reference to FIG. 17 and FIG. 19. Here, FIG. 17 is a block diagram illustrating a hardware configuration and a functional configuration of an analysis apparatus 100B of the second modification. FIG. 19 is a diagram specifically describing a parameter extracting process and a parameter processing process in the analysis apparatus 100B of the second modification. Like reference numerals designate corresponding or identical elements throughout the drawings, and therefore such elements will not be further elaborated here.

As illustrated in FIG. 17, the analysis apparatus 100B of the second modification is also constituted similarly to the analysis apparatus 100 of this embodiment illustrated in FIG. 2. However, in the analysis apparatus 100B of the second modification, similarly to the analysis apparatus 100A of the first modification, the appearance-frequency acquiring unit 112c is newly added to the flow analyzing unit 112 and a frequency table 128B is newly added to the storage unit 120. In the storage unit 120, a parameter table 126B and path information 127B are saved instead of the parameter table 126 and the path information 127.

The appearance-frequency acquiring unit 112c of the second modification acquires the appearance frequency of the request for each request. As illustrated in FIG. 19, the acquired appearance frequencies are made to correspond to the respective requests and the path IDs of the respective requests and are saved in the frequency table 128B. Here, in the example illustrated in FIG. 17, the appearance-frequency acquiring unit 112c is included in the flow analyzing unit 112 of the processing unit 110. The example is not limited to this.

The common-parameter extracting unit 113a of the second modification extracts the parameter appearing only in the request with the appearance frequency higher than the predetermined threshold within the request log (access log/URI) of this request, as the common parameter.

Next, with reference to FIG. 19, a description will be given of the operations of the appearance-frequency acquiring unit 112c, the common-parameter extracting unit 113a, and the identification-parameter extracting unit 113b of the second modification, and the parameter table 126B and the path information 127B of the second modification.

As illustrated in FIG. 19, in the second modification, the frequency table 128B is created by the appearance-frequency acquiring unit 112c. In the frequency table 128B illustrated in FIG. 19, the appearance frequency in each line (each request) of the path table 125 are made to correspond to the parameter appearing only in the corresponding request and is saved. That is, in the example illustrated in FIG. 18, in the first line of the frequency table 128B corresponding to the request in the first line of the path table 125, the path ID "1", the parameter "fid=3:ui=ss" appearing only in the first line of the path table 125, and the appearance frequency "30" of this request are described. Descriptions similar to the description in the first line are written after the second line of the frequency table 128B corresponding to the request after the second line of the path table 125.

The common-parameter extracting unit 113a refers to the path table 125 and the frequency table 128B to extract the parameter appearing only in a request where the appearance frequency is higher than a predetermined threshold from the access log of this request as the common parameter (see an arrow A31). Here, the high or low level of the appearance frequency may be determined by comparison between the appearance frequency and the predetermined threshold (the number) as described above or may be determined by comparison between: the proportion of the appearance frequency to the total number; and a predetermined threshold (proportion). Here, the appearance frequencies in the frequency table 128B illustrated in FIG. 19 are all determined to be higher than the predetermined threshold.

At this time, in the example illustrated in FIG. 19, the common-parameter extracting unit 113a extracts the following common parameter. That is, as the common parameters corresponding to three URIs that correspond to the path ID "1", three combinations of "fid=3:ui=ss", "tab=2:col=5", and "tab=3:col=4" are extracted. As the common parameters corresponding to two URIs that correspond to the path ID "2", two combinations of "fid=2:col=3" and "tab=5:ui=small" are extracted.

Then, the identification-parameter extracting unit 113b extracts the three combinations of "fid=3:ui=ss", "tab=2:col=5", and "tab=3:col=4" from the extracted common parameters as described above as the combination of the parameter appearing only in the path ID "1" (see an arrow A32). Similarly, the identification-parameter extracting unit 113b extracts the two combinations of "fid=2:col=3" and "tab=5:ui=small" as the combination of the parameter appearing only in the path ID "2" (see the arrow A32).

With reference to FIG. 16, in the above-described embodiment, in this phase for extracting the identification parameter, "ui" has the key alone in both the path ID "1" and the path ID "2", and thus there is no parameter that identifies the path. In contrast, in the second modification, the appearance frequency of each request is counted as the appearance frequency of the combination of the keys appearing only in each request and the appearance-frequency information (frequency table 128B) is created. Then, based on the appearance-frequency information (frequency table 128B), the combination of the keys with the appearance frequencies higher than the predetermined threshold is extracted as the common parameter, that is, the identification parameter. Accordingly, the combination of the keys (that is, the keys with low appearance frequencies) with the appearance frequencies equal to or less than the predetermined threshold is excluded from the candidate of the identification parameter. Thus, an appropriate parameter can be accurately extracted as the identification parameter.

The five combinations of the identification parameters "fid=3:ui=ss", "tab=2:col=5", "tab=3:col=4", "fid=2: col=3", and "tab=5:ui=small" extracted as described above are collectively described as "use, fid", "use, ui", "use, tab", and "use, col" in the parameter table 126B illustrated in FIG. 19 (see an arrow A33).

Then, the parameter processing unit 114 performs filtering processing of the path table 125 based on the parameter table 126B obtained as described above (see an arrow A34). That is, the parameter processing unit 114 applies the parameter table 126B to the path table 125 and processes the path table 125 so as to generate the path information 127B indicating the relationship between the URI description (process) that includes the minimum necessary parameter and the path ID (component group). In the example illustrated in FIG. 19, the lines of the path information 127A correspond to the respective lines of the path table 125. Each line is rewritten such that the key and the value of the key are remained regarding the four keys "fid=", "ui=", "tab=", and "col=" but are removed regarding other keys.

(5) Others

While the preferred embodiments of the present invention have been described in detail above, the present invention is not limited to these specific embodiments. The embodiments may be deformed or modified in various ways and implemented without departing from the spirit of the present invention.

While in the above-described embodiments the case where the parameter in the URI is targeted has been described, the present invention is not limited to this. The present invention is similarly applicable to parameters of a POST method or an HTTP header or similar information so as to obtain operations and effects similar to those described above.

According to one embodiment, the process can be accurately categorized by the appropriate parameter included in the log obtained during the execution of the process.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An analysis method implemented by a processor, the analysis method comprising:
   extracting, in a pre-analysis phase before an operation phase where an operation of a system is actually performed, first common parameters in common between a plurality of request logs from parameters in the plurality of request logs, the plurality of request logs being obtained when a request is executed by a process that uses a plurality of components included in the system;
   determining, in the pre-analysis phase, one of the first common parameters different from each of second common parameters extracted for another process, as an identification parameter that identifies the process; and
   creating, in the pre-analysis phase, path information indicating a relationship between the process and the plurality of components based on the identification parameter, the path information being used for identifying a problematic part during the operation phase.

2. The analysis method according to claim 1, wherein each of the plurality of request logs includes:
   one access log obtained for each request; and
   a plurality of detail logs corresponding to the one access log.

3. The analysis method according to claim 2, further comprising:
   acquiring, for each request, a type of a correspondence component corresponding to each of the plurality of detail logs among the plurality of components based on a description included in each of the plurality of detail logs;
   creating, for each request, a correspondence table that makes the type of the correspondence component acquired for each request to correspond to a description related to the parameter included in the one access log; and
   extracting the first common parameters from the parameters in the plurality of request logs based on the created correspondence table.

4. The analysis method according to claim 3, further comprising
   acquiring the type of the correspondence component using a component definition that is preliminarily defined and makes respective descriptions included in the plurality of detail logs to correspond to respective types of the plurality of components.

5. The analysis method according to claim 3, further comprising
   creating, in the pre-analysis phase, the path information by processing the correspondence table based on the identification parameter.

6. The analysis method according to claim 1, wherein
   each of the parameters includes a key and a value corresponding to the key; and
   in the extracting, when one parameter has the key and the value in common with another parameter among the parameters in the plurality of request logs, both the key and the value included in the one parameter are extracted as one of the first common parameters.

7. The analysis method according to claim 1, wherein
   each of the parameters includes a key and a value corresponding to the key; and
   in the extracting, when one parameter does not have a value in common but has a key in common with another parameter among the parameters in the plurality of request logs, the key included in the one parameter is extracted as one of the first common parameters.

8. The analysis method according to claim 1, further comprising
acquiring an appearance frequency of each of the parameters in the plurality of request logs; wherein
each of the parameters includes a key and a value corresponding to the key; and in the extracting, in a case where the appearance frequency acquired for one parameter does not have the value in common but has the key in common with another parameter is higher than a predetermined threshold among the parameters in the plurality of request logs, both the key and the value included in the one parameter are extracted as one of the first common parameters.

9. The analysis method according to claim 1, further comprising
acquiring an appearance frequency of each of the parameters in the plurality of request logs; wherein each of the parameters includes a key and a value corresponding to the key; and
in the extracting, in a case where the appearance frequency acquired for one parameter does not have the value in common but has the key in common with another parameter is lower than a predetermined threshold, the key included in the one parameter is extracted as one of the first common parameters.

10. The analysis method according to claim 1, further comprising
acquiring, for each request, an appearance frequency of the request; wherein
in the extracting, a parameter, that is included in a request log regarding a request in which the appearance frequency is higher than a predetermined threshold and that appears only in the request, is extracted as one of the first common parameters.

11. The analysis method according to claim 1, wherein
in the determining, a minimum parameter or a minimum combination that identifies the process is determined as the identification parameter from the first common parameters.

12. An analysis apparatus comprising:
a memory; and
a processor coupled to the memory and configured to:
extract, in a pre-analysis phase before an operation phase where an operation of a system is actually performed, first common parameters in common between a plurality of request logs from parameters in the plurality of request logs, the plurality of request logs being obtained when a request is executed by a process that uses a plurality of components included in the system;
determine, in the pre-analysis phase, one of the first common parameters different from each of second common parameters extracted for another process, as an identification parameter that identifies the process; and
create, in the pre-analysis phase, path information indicating a relationship between the process and the plurality of components based on the determined identification parameter, the path information being used for identifying a problematic part during the operation phase.

13. The analysis apparatus according to claim 12, wherein:
each of the parameters includes a key and a value corresponding to the key; and the processor is further configured to extract, when one parameter has the key and the value in common with another parameter among the parameters in the plurality of request logs, both the key and the value included in the one parameter as one of the first common parameters.

14. The analysis apparatus according to claim 12, wherein:
each of the parameters includes a key and a value corresponding to the key; and
the processor is further configured to extract, when one parameter does not have a value in common but has a key in common with another parameter among the parameters in the plurality of request logs, the key included in the one parameter as one of the first common parameters.

15. The analysis apparatus according to claim 12, wherein:
the processor is further configured to:
acquire an appearance frequency of each of the parameters in the plurality of request logs;
each of the parameters includes a key and a value corresponding to the key; and
the processor is further configured to extract, in a case where the appearance frequency acquired for one parameter does not have the value in common but has the key in common with another parameter is higher than a predetermined threshold among the parameters in the plurality of request logs, both the key and the value included in the one parameter as one of the first common parameters.

16. The analysis apparatus according to claim 12, wherein:
the processor is further configured to:
acquire an appearance frequency of each of the parameters in the plurality of request logs; and
extract, in a case where the appearance frequency acquired for one parameter does not have the value in common but has the key in common with another parameter is lower than a predetermined threshold, the key included in the one parameter as one of the first common parameters.

17. The analysis apparatus according to claim 12, wherein:
the processor is further configured to:
acquire, for each request, an appearance frequency of the request; and
extract a parameter, that is included in a request log regarding a request in which the appearance frequency is higher than a predetermined threshold and that appears only in the request, as one of the first common parameters.

18. The analysis apparatus according to claim 12, wherein
the processor is further configured to determine a minimum parameter or a minimum combination that identifies the process as the identification parameter from the first common parameters.

19. A non-transitory, computer-readable recording medium stored therein an analysis program for causing a computer to execute a process comprising:
extracting, in a pre-analysis phase before an operation phase where an operation of a system is actually performed, first common parameters in common between a plurality of request logs from parameters in the plurality of request logs, the plurality of request logs being obtained when a request is executed by a process that uses a plurality of components included in the system;

determining, in the pre-analysis phase, one of the first common parameters different from each of second common parameters extracted for another process, as an identification parameter that identifies the process; and creating, in the pre-analysis phase, path information indicating a relationship between the process and the plurality of components based on the identification parameter, the path information being used for identifying a problematic part during the operation phase.

20. The non-transitory, computer-readable recording medium stored therein the analysis program according to claim 19, wherein each of the plurality of request logs includes:
one access log obtained for each request; and
a plurality of detail logs corresponding to the one access log.

* * * * *